United States Patent [19]

[11] 3,811,114

Lemay et al.

[45] May 14, 1974

[54] DATA PROCESSING SYSTEM HAVING AN IMPROVED OVERLAP INSTRUCTION FETCH AND INSTRUCTION EXECUTION FEATURE

[75] Inventors: Richard A. Lemay, Bolton; David D. DeVoy, Dedham, both of Mass.

[73] Assignee: Honeywell Information Systems, Inc., Waltham, Mass.

[22] Filed: Jan. 11, 1973

[21] Appl. No.: 322,806

[52] U.S. Cl. .............................................. 340/172.5
[51] Int. Cl. .............................................. G06f 9/00
[58] Field of Search .................................. 340/172.5

[56] References Cited

UNITED STATES PATENTS

| | | | |
|---|---|---|---|
| 3,168,724 | 2/1965 | Anderson | 340/172.5 |
| 3,254,329 | 5/1966 | Lukoff et al. | 340/172.5 |
| 3,260,997 | 7/1966 | Arndt et al. | 340/172.5 |
| 3,533,077 | 10/1970 | Bell et al. | 340/172.5 |

*Primary Examiner*—Raulfe B. Zache
*Attorney, Agent, or Firm*—Faith F. Driscoll; Ronald T. Reiling

[57] ABSTRACT

A data processing system includes a main memory, a central processing unit, an input-output processing unit and a scientific processing unit. The central processing unit is operative to fetch each of the instructions of a program stored in main memory and then determines whether the execution of the instruction by either the input-output processing unit or the scientific processing unit can be overlapped with the central processing unit's fetching of a next instruction of the program. The scientific processing unit includes storage which enables the unit to execute certain types of instructions it receives from the central processing unit independently of the central processing unit. when the central processing unit determines that it has fetched one of these types of instructions, it begins immediately fetching a next instruction after it has delivered to the scientific processing unit information the scientific unit requires for executing the instruction. The system also includes apparatus which allows an operator access to the scientific unit storage for checking purposes.

27 Claims, 17 Drawing Figures

PATENTED MAY 14 1974

3,811,114

SHEET 02 OF 16

PATENTED MAY 14 1974

3,811,114

SHEET 04 OF 16

DATA PROCESSING SYSTEM HAVING AN IMPROVED OVERLAP INSTRUCTION FETCH AND INSTRUCTION EXECUTION FEATURE

BACKGROUND OF THE INVENTION

1. Field of Use

This invention relates to data processing systems and more particularly to data processing systems which overlap instruction fetches or extractions and instruction execution.

2. Prior Art

As is well known, present day data processing systems normally include a central processing unit or main processing unit, a scientific unit, and an input/output processing unit. In order to enhance processing speeds, some processing systems provide separate interfaces between the main or central processing unit and the input/output data processing unit. This arrangement enables each processor to communicate with the memory system without delaying temporarily the operations being performed by each processing unit. Because the input/output processor activities are under the control of the main processing unit during their initiation phase, some operations performed by the input/output processor relating to the initiation phase have been the cause of postponing the main processing unit from further instruction processing. One such operation has been the loading of buffer storage included within the input/output processor pursuant to a data transfer instruction. This operation was required to be completed before the main processor released itself from the processing of the data transfer instruction. This prior art arrangement resulted in delay of instruction processing by the system rendering it essentially sequential in nature as viewed from the point of instruction execution.

More importantly, the data processing systems mentioned above normally require the scientific unit to execute "scientific" instructions under the control of the central of main processing unit. These instructions specify operations upon numerical data in floating point representations. Operations involving numerical data in fixed point representations are handled by the central processing unit. One reason for the previously mentioned control is that much of the data pertinent in processing the scientific instruction normally was fetched or extracted from main memory and stored by the central processing unit preliminary to instruction execution by the scientific unit. The result was that even though the scientific instruction may specify an operation requiring only the use of scientific registers, the central processing unit was not operative to initiate extraction of another instruction until the scientific operation has been completed. Accordingly, in prior art processors, the processing of non-scientific instructions and scientific instructions were required to proceed serially.

Accordingly, it is a primary object of the present invention to provide an arrangement wherein a data processing system can maximize the overlapping of instruction executions by the main subsystems included within the data processing system.

It is a further object of the present invention to provide an arrangement wherein a data processing system permits a maximum overlap of scientific instruction execution by a scientific subprocessing unit and subsequent non-scientific instruction executions by the other subprocessors of the system.

It is still a further object of this invention to provide an arrangement which maximizes the overlap in processing of instructions by different subprocessing units whose operations are dependent upon another one of the subprocessing units of the system with a minimum increase in system hardware.

It is a more specific object of the present invention to provide a system arrangement which permits significant overlap of scientific instruction execution by a scientific subprocessor and subsequent non-scientific instruction execution by a main processor required to control the operations of the scientific unit.

SUMMARY OF THE INVENTION

These and other objects of the present invention are achieved in a data processing system which includes a main or central processing unit, a scientific processing unit and an input/output processing unit. The main processing unit and input/output processing unit are arranged to have independent access to the memory system of the data processing system. Additionally, the main or central processing unit includes means for determining the earliest point in time it is able to release itself from processing a particular instruction which it had been extracting from the memory system for execution by another processing unit of the system. More particularly, the main processing unit includes means for decoding scientific instruction types into a number of classes and in accordance with such decoding determine the earliest point in time the central processing unit can begin extraction of a next instruction from the memory system. Additionally, the scientific unit is arranged to include memory means for storing information required only in processing scientific instructions.

The arrangement described above enables the central processing unit to begin extracting a next instruction from the memory system immediately following the extraction of a previous instruction which specified an operation requiring only the availability of registers for storing scientific data. Additionally, the scientific unit includes means for detecting commands issued by an operator which call for the display of information stored during the processing of a previous scientific instruction. Thus, although the responsibility for maintaining storage of information accumulated during the processing of scientific instructions has been removed from the central processing unit, the arrangement of the present invention still permits an operator to have the same facility of being able to display the contents of scientific registers. Additionally, it is now possible to reallocate the temporary storage provided within the central processing unit for storing the scientific information to now store other information as required to accommodate non-scientific operations. Thus, the present invention is able to provide the above-mentioned overlap processing and maintain the increase in the existing logic circuits of the system to a minimum.

The novel features which are believed to be characteristic to the invention both as to its organization and method of operation together with further objects and advantages will be better understood from the following description when considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
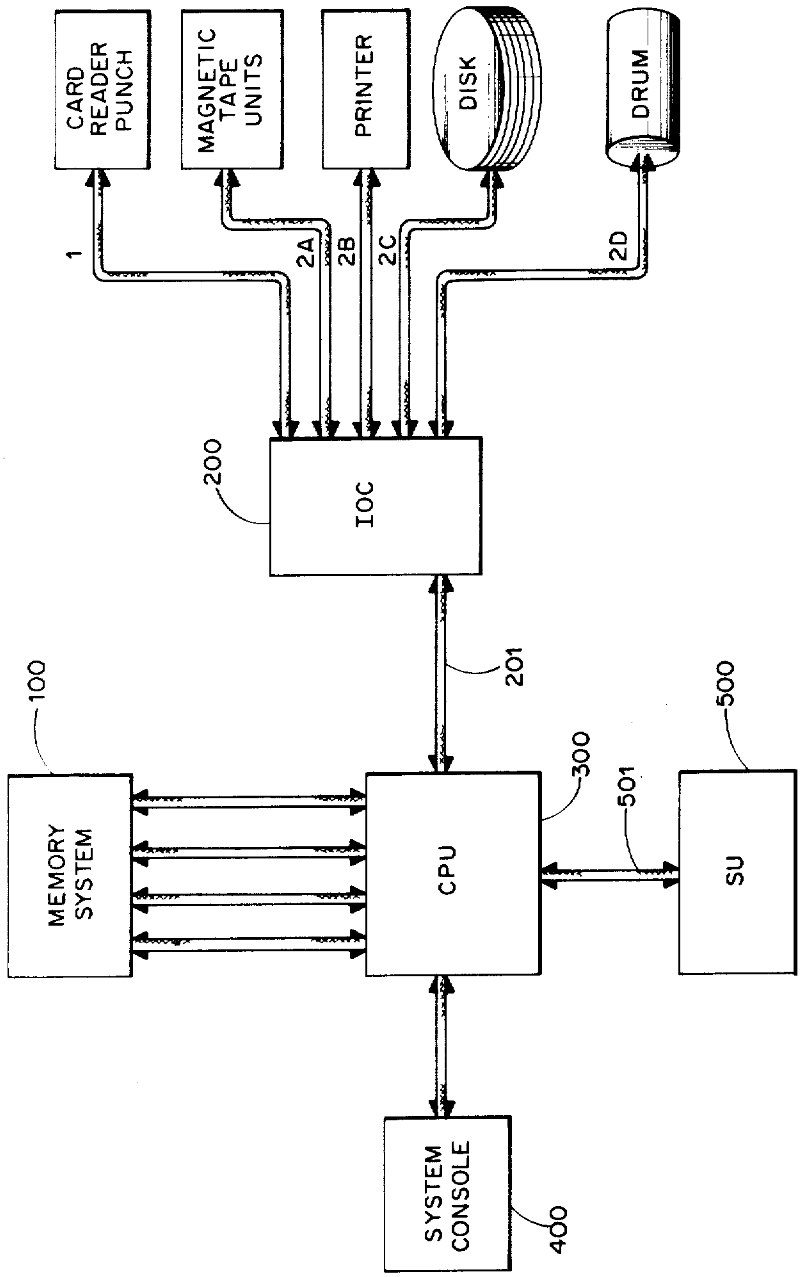
FIG. 1 shows in block diagram from a data processing system which incorporates the apparatus of the present invention.

FIG. 1 shows in block diagram form the various sections of a data processing system which incorporates principles of the present invention. The system includes a central processing unit or main processing unit 300 herein referred to as CPU, arranged to communicate with the memory system 100 which comprises a plurality of memory modules which can be accessed independently from separate memory interfaces. The CPU 300 couples to a scientific processing unit 500 herein referred to as SU via an interface 501 through which both instructions and information can be bidirectionally transferred between units. Additionally, the CPU 300 couples to a system console 400 from which the CPU can receive commands by an operator. It is also seen from FIG. 1 that an input/output processing unit 200 herein referred to as IOC, couples to the CPU 300 via an input/output bus and separately to memory system 100 via a separate memory interface.

In accordance with the present invention, the IOC can be for the purposes of the present invention considered for most part conventional in design in the way it handles data transfers between it and a plurality of sectors to which a plurality of peripheral devices connect. For example, in this regard, the IOC may take the form of the input/output processing unit described in a publication titled "Model 3200 Summary Description" published by Honeywell Inc., Copyrighted 1970, Order Number 111,0015,000,1–C52. Additionally, reference may also be made to U.S. Pat. No. 3,323,110 titled "Information Handling Apparatus including Freely Assignable Read-Write Channels" invented by Louis G. Oliari and Robert P. Fischer which issued May 9, 1967 and is assigned to the assignee of the present invention. Accordingly, only those portions of the IOC which have been modified to operate in accordance with the principles of the present invention will be described in greater detail herein. Thus, for further information regarding the overall operation of the IOC, reference should be made to the publication and patent mentioned.

IOC 200

The IOC 200 is operative to coordinate exchanges of data characters between available peripheral controllers/devices coupled to the IOC and the memory system 100 during the initiation and execution of peripheral data transfer instructions.

Figure 2:
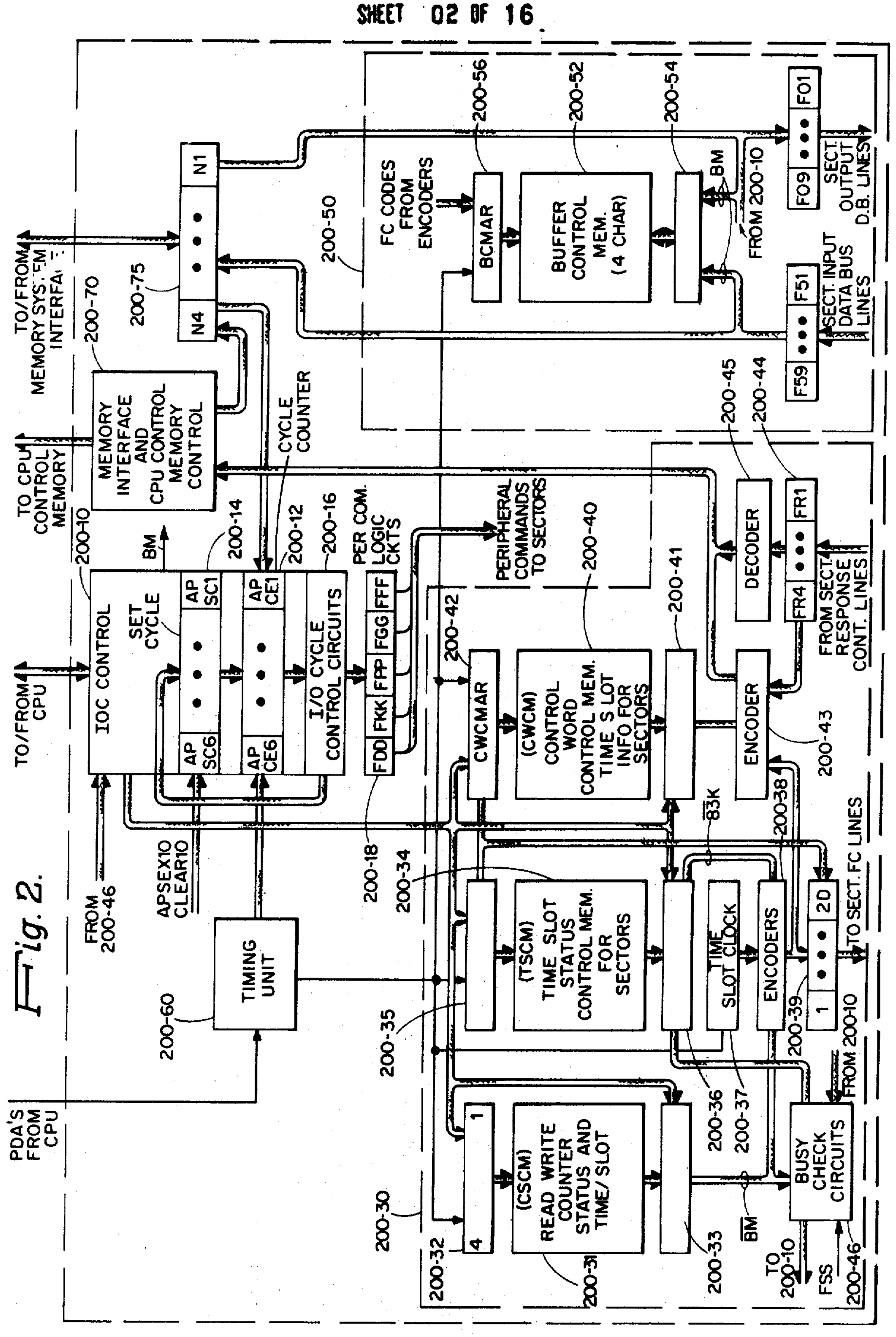
FIG. 2 shows in greater detail the different sections of the input/output processing unit of FIG. 1.

As seen from FIG. 2, the IOC includes a control section 200–10, a control memory section 200–30 data control section 200–40 arranged as shown. The timing signal for the system are generated by a timing unit 200–60 which receives input signals from the CPU via bus 201.

Control Section 200–10

The control section 200–10 includes an I/O cycle counter 200–12 and a series of storage registers and decoding circuits not shown for storing a plurality of control characters received from the memory system 100 pertinent to the initiation and execution of a peripheral data transfer instruction, as explained herein.

The section 200–10 includes a plurality of set cycle circuits 200–14 which include a plurality of AND gating circuits. These circuits in response to signals from a block 200–16 and signals from the CPU are operative to switch the cycle counter circuits to an appropriate state.

The I/O control circuits of block 200–16 in response to signals from the cycle counter circuits 200–12 and signals from the set cycle circuits 200–14 are operative to generate peripheral control signals which indicate to each of the devices of a sector the type of control information being applied to the data bus lines of the sector. More specifically, these signals cause any one of a plurality of flip-flops FDD through FGG included in a Peripheral Command Logic Circuits block 200–18 to be switched to a binary ONE. When the FDD flip-flop is switched to a binary ONE, it generates signals APFDD10 through APFDD90, each of which signal the fact that the address code of a peripheral control unit has been placed on its associated sector bus lines. The FDD flip-flop is switched to a binary ONE during an E2 cycle (i.e., when signal APCE210 is a binary ONE) in response to a set peripheral command signal APSCPC10, generated in response to a signal APPFF00 and APSSS10 generated by circuits 200–16 and a timing signal FET0110 from timing unit 200–60.

The FKK flip-flop signals when the IOC 200 applies a control variant character to the output sector bus lines. This flip-flop is switched to a binary ONE under several instances such as for example when the IOC 200 is processing a peripheral data transfer instruction (i.e., signal APPDT10 is a binary ONE) during an E3 cycle (i.e., when signal APCE310 is a binary ONE) in response to signal APSPC10.

The FPP flip-flop signals when the IOC 200 applied a parameter control character to the output bus lines of a sector. This flip-flop switches to a binary ONE during an E4 cycle (i.e., when signal APE410 is a binary ONE) in response to signal APSPC10.

The FGG flip-flop signals when the IOC 200 applies a code on the output bus lines of a sector identifying the read write channel (RWC). This flip-flop is switched to a binary ONE during an E6 cycle (i.e., when a signal APCE610 is a binary ONE), the peripheral device specified by a data transfer instruction is not busy (i.e., signal APBSY10 is binary ZERO), during a data transfer instruction (i.e., signal APDT10 is a binary ONE) in response to a signal APSPC10.

The last flip-flop FFF, signals the termination of control character transfers during an E6 cycle (i.e., when signal AOCE610 is a binary ONE), upon the sensing of a word mark code in one of the characters fed from the memory system in response to signal APSPC10. Because the remaining sections are not that pertinent to the present invention, they will be described only briefly.

Control Memory Section 200–30

This section includes a plurality of memories 200–31, 200–34 and 200–40. Counter status control memory (CSCM) 200–31 stores information indicating the active status of the read/write counter storage locations of the CPU control memory. Time slots status control memory (TSCM) 200–34 stores information indicating the active status of the "time slots" of each sector. As seen from FIG. 2, both memories can be addressed from control section 200–10 via their address registers 200–32 and 200–35 and loaded with new information by the section 200–10 via their input/output registers 200–33 and 220–36. Also, both memories have their operations timed by signals generated by timing unit 200–60. The contents of both registers 200–33 and 220–36 are applied to circuits of a block 200–46 which is conditioned by control section 200–10 to test the availability of the various resources required for bit transfer operation. These include "read-write" counters, "time slots," and peripheral devices. The status of the device is determined by testing the state of line FSS.

A time slot clock circuit 200–37 is cycled repetitively and within a complete operative cycle of 12 microseconds generates six different three code patterns, each of which endure for 2 microseconds. These codes establish six time slot periods for a sector and are converted by the encoder circuit 200–38 into six five bit codes which are applied to the FC lines of each of the sectors 1 through 2D.

As indicated from FIG. 2, the signals from clock circuit 200–37 are directly applied to an encoder circuit and establish codes for six independent 83K character per second transfer rates. In rates greater than 83KC where more than one time slot interval is assigned to a single peripheral device, information stored in the memory 200–34 is used to generate a common five bit code which is repeated the number of times within a complete operative cycle to establish the rate. The signals from the register 200–33 of the CSCM unit 200–31 are applied to the encoder circuits during unbuffered input data transfer operations to force the encoders to generate an unassigned code when access to the memory system is not available thereby preventing a loss of data characters.

The control word control memory (CWCM) 200–40 actually includes two memories, one for servicing sectors 1, 2*a* and 2*d* and the other for servicing sectors 2*b* and 2*c*. Where the assignments of Read Write Counter locations are fixed, the CWCM unit 200–40 is first addressed from the codes applied to the FC lines via an address register 200–42. The signals read out to an input/output register 200–41 of the memory 200–40 are applied without modification via a memory interface and control memory unit 200–70 to the CPU control memory. The unit 200–70 generates the necessary control signals which indicate that an I/O peripheral cycle is taking place which stalls CPU operation allowing the IOC 200 to access the memory system 100 as well as CPU control memory. This occurs when the IOC 200 receives a pre-determined response code on lines FR1-FR4 of the sector from a peripheral device which when decoded by a decoder circuit 200–45 conditions the unit 200–70 to generate a peripheral buffer cycle signal which is applied to the CPU cycle and control circuits.

In instances where the read/write counter storage locations are not "fixed" but can be assigned to any sector, the address used to address CPU control memory is generated by first addressing memory 200–40 via the code applied to the FC lines and then the information read out into register 200–41 is modified to the correct address by an encoder circuit 200–43. As seen from FIG. 2, the CWCM 200–40 can be loaded by the IOC control unit 200–10 with new information during the initiation phase of processing of a data transfer instruction.

Buffer Section 200–50

This section includes buffer storage memory 200–52 which provides storage for the four buffered sectors of the system. The memory 200–52 actually includes two memories, one for sectors 2A and 2D and the other for sectors 2B and 2C. Both are addressed via an address register 200–56 by the FC codes generated by the encoder 200–38. The data characters received from the input data lines of a sector during an input data transfer operation are written into the buffer of a sector via an input/output register 200–54 and when the buffer is filled, its contents are read out into a memory input-/output register 200–75. During an output data transfer operation, four characters from the memory system stored in register 200–75 and thereafter transferred a character at a time to the output bus lines of the sector. During unbuffered operations, the memory 200–52 is bypassed and the characters are transferred between the register 200–75 and sector bus lines.

Memory System 100

Figure 3:
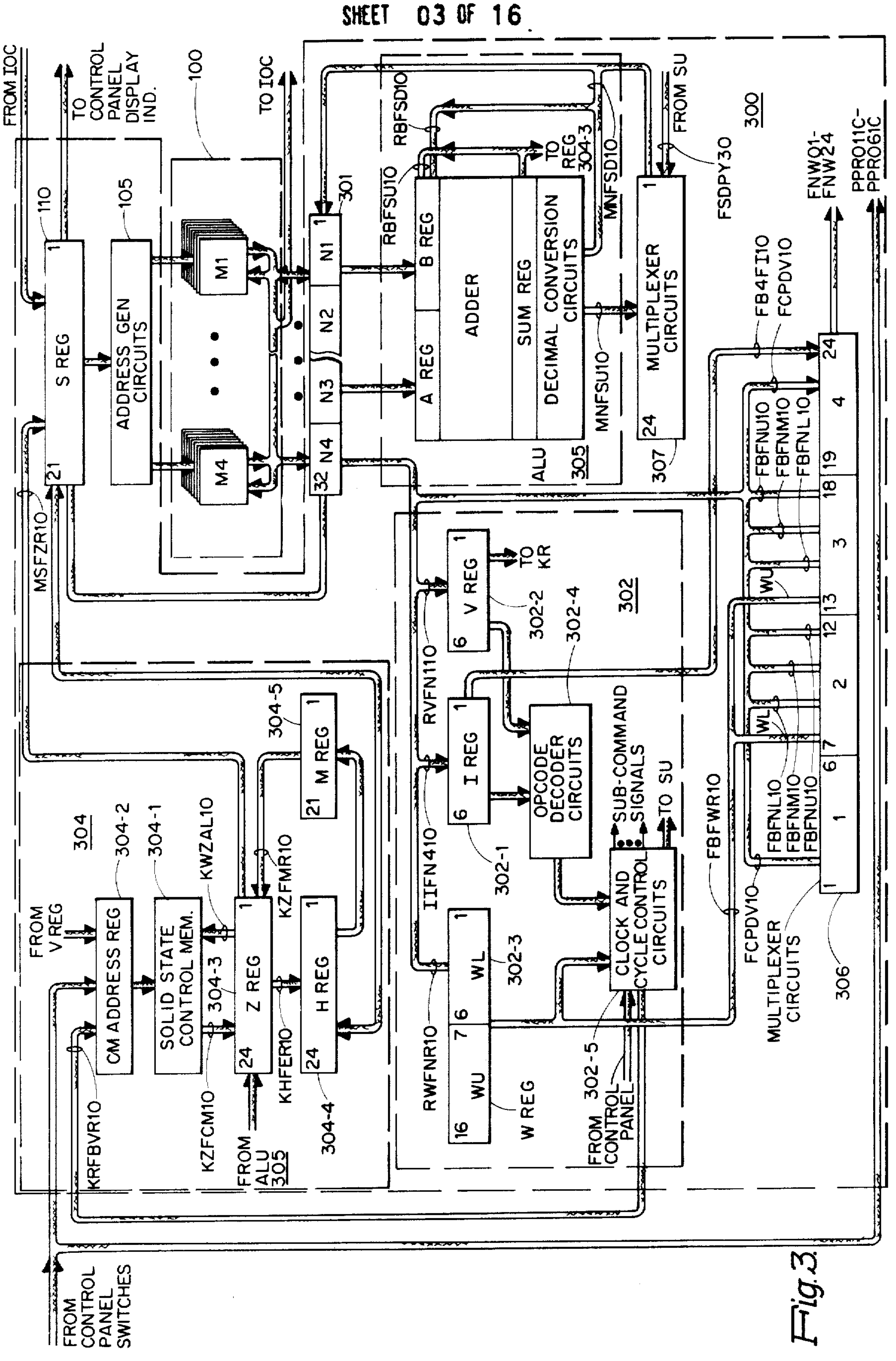
FIG. 3 shows in greater detail the various sections of the central processing unit of FIG. 1.

FIG. 3 shows in greater detail the CPU 300 and the memory system 100 of FIG. 1. The memory system 100 comprises a plurality of character wide memory modules arranged in rows and columns so as to provide a four character wide memory interface to both the CPU 300 and IOC 200. That is, the memory system is arranged so that the contents of four consecutive character storage locations can be accessed at a time from the memory system 100. As seen from FIG. 3, the CPU 300 includes appropriate address generating circuits 105 which provide a plurality of addresses for accessing the four characters simultaneously. The addresses are generated from an initial address transferred to an S register 110 from either the CPU 300 or IOC 200.

CPU 300

As shown in FIG. 3, the CPU 300 transmits and receives in groups of four data characters to and from the memory system 100 via an input/output register 301. This register is divided into four sections N1–N4, each of which is capable of storing a character. The register 301 couples to registers included in a control section 302 and in an arithmetic and logic (ALU) section 305 as shown.

The CPU 300 also includes a control memory section 304. This section includes a solid state control memory 304–1 comprising 64 addressable storage locations which store addresses and data pertinent to the processing of input/output data transfer instructions and non-scientific instructions. The control memory 304–1 is addressed from either the control panel switches of the system console 400 or from the CPU sections via a control memory address register 304–2. When addressed during a memory cycle of operation, the contents of the storage location are read out into an input-/output register 304–3 and are applied to the memory address register 110 for reading out additional storage locations in memory system 100 or they are applied to a temporary storage register 304–4 for modification by an auxiliary increment/decrement register 304–5. The contents read out into register 304–3 are returned either modified or unmodified into the addressed storage location during the write portion of the same memory cycle of operation. Additionally, signals from the memory system 100 can be written into control memory 304–1 via the ALU adder.

The subcommands which cause the above-mentioned transfers of address information and modification of the same information are generated by the control section 302. The control section 302 is operative to interpret the various instruction op-codes and in accordance with the interpretation generate a sequence of subcommand signals required to execute the operation specified.

Although not shown in FIG. 3, the central processing control section 302 includes a master clocking unit which provides the basic timing signals for the system and in essence divides the CPU processing cycles into a plurality of time intervals. These timing signals together with control signals established by a plurality of bistable storage devices which comprise the cycle control unit of the system, define a number of major cycles during which specified operations are carried out by the CPU during its extraction and execution of an instruction. For purposes of the present invention extraction refers to operations involved in retrieving an instruction from the memory system 100, modifying the operand addresses within the instruction as required and transferring each portion of the instruction to its designated storage register.

Each instruction in accordance with the data processing system can have up to six basic formats and can be accessed in any one of a number of different modes which are defined by the programmer. The formats and modes contemplated are described in considerable detail in the above-mentioned publication. For that reason, the formats and character modes processed by the CPU will be described only to the extent necessary to understand the present invention.

It is seen that section 302 includes a plurality of registers which are arranged to store various portions of an instruction when the instruction has been read out to register 301. The registers include an op-code or I register 302–1, a variant character or op-code modifier V register 302–2 and a further variant or control character storage register designated as W register 302–3. The contents of these registers are applied to op-code and decoder circuits 302–4 which in turn decode the contents of these various registers and condition the circuits of the clock and cycle control circuit block 302–5 to generate the required sequence of subcommand signals for processing that instruction.

Additionally, it is also seen that the contents of the I, W and V registers are applied to a multiplexer circuit 306 whose output terminals couple to an input bus which in turn couples to the SU. It can be seen that the multiplexer circuit 306 receives additional sources of input signals which include the various sections of the input/output register 301. The multiplexer circuit 306 can be considered conventional in design and operates to apply to the input bus, the appropriate set of signals from the input sources designated by the subcommand signals produced by control circuits 302–5. Considering block 306 in greater detail it is seen that it includes four sections each having six bits of information and each section capable of multiplexing signals from up to four input sources.

Similarly, the multiplexer circuit block 305 operates as mentioned above to multiplex signals from both the SU and ALU 303 and feed these signals as an input to the input/output register 301. The ALU section 303 includes an adder conventional in design arranged to perform both arithmetic and logical operations upon a pair of operands transferred to first and second operand registers designated as A and B registers respectively in FIG. 3.

Op-Code Decoder Circuits 302–4

The op-code decoder circuits included within block 302–4 and the circuits which detect when the I register 302–1 stores an op-code character are disclosed in FIGS. 4*a* through 4*d*. The circuits of the op-code decoder circuit block is operative to determine whether an instruction being processed is a scientific instruction and determine whether the CPU can overlap the processing of that instruction with a subsequent instruction. More specifically, these circuits are arranged to decode and classify the instructions executed by the SU into three separate classes referred to herein as overlap class X, overlap class Y and overlap class Z.

The overlap class X identified a full overlap situation wherein the CPU begins processing a next instruction immediately after it has extracted the scientific instruction from the memory system 100. As explained herein, the instructions within this class have a format FAA and specify register to register transfers required to take place within the SU.

The overlap class Y identifies a partial overlap case wherein the CPU can begin processing a next instruction immediately after it delivers to the SU an operand from the memory system 100. The instructions within this class are those which specify memory to register transfer operations and have a format FMA.

The last overlap class Z defines a category of instructions which have no overlap. Thus, the CPU begins a next instruction immediately after the SU has delivered the result to the CPU which it writes into the memory system 100. The various types of instructions executed by the scientific processing unit and detected by the CPU are shown with their formats and overlap classification and the table therein to follow.

TABLE OF SCIENTIFIC INSTRUCTIONS

| Instruction type | Abbre-viation | Format F | A | B | V1 | V2 | Type of operation | Over-lap class |
|---|---|---|---|---|---|---|---|---|
| Store floating point accumulator. | STF | 06 | - | - | XY | 00 | Rto R | X |
| Load low order result. | LDL | 06 | - | - | X0 | 01 | Rto R | X |
| Load floating point accumulator. | LDF | 06 | - | - | XY | 02 | R to R | X |
| Store low order result. | STL | 06 | - | - | 0Y | 07 | Rto R | X |
| Floating point add. | FAD | 06 | - | - | XY | 10 | Rto R | X |
| Floating point subtract. | FSB | 06 | - | - | XY | 11 | Rto R | X |
| Floating point divide. | FDV | 06 | - | - | XY | 12 | Rto R | X |
| Floating point multiply. | FMP | 06 | - | - | XY | 13 | Rto R | X |
| Binary mantissa shift. | BMS | 04 | - | - | XM | V2 | Rto R | X |
| Store floating point accumulator. | STF | 07 | A | - | X0 | 00 | Rto M | Z |
| Load low order result. | LDL | 07 | A | - | 00 | 01 | Mto R | Y |
| Load floating point accumulator. | LDF | 07 | A | - | 0Y | 02 | Mto R | Y |
| Decimal to binary. | DTB | 07 | A | - | 0Y | 03 | Mto R | Y |
| Floating point test and branch on accumulator. | FBA | 07 | A | - | XC | 04 | - | Z |
| Floating point test and branch on indicator. | FBI | 07 | A | - | OD | 05 | - | Z |
| Binary to decimal. | BTD | 07 | A | - | X0 | 06 | Rto M | Z |
| Store low order result/STL |  | 07 | A | - | 00 | 07 | Rto M | Z |
| Floating add...... | FAD | 07 | A | - | XY | 10 | Mto R | Y |
| Floating substract. | FSB | 07 | A | - | XY | 11 | Mto R | Y |
| Floating divide... | FDV | 07 | A | - | XY | 12 | Mto R | Y |
| Floating multiply. | FMP | 07 | A | - | XY | 13 | Mto R | Y |
| Binary integer multiply. | BIM | 05 | A | B | - | - | Mto M | Z |

As mentioned previously, the op-code decoder circuits 302-4 by decoding the op-code bit pattern contained within op-code register 301-1 are able to identify a particular scientific instruction as being included within one of the three overlap classes. It will be noted that the op-code only provides format information and does not identify the type of arithmetic operation to be performed. That is, as seen from the above table, the op-code specifies an instruction as involving a register to register transfer, a memory to register transfer, or a register to memory transfer. Thus, each class of instructions includes all types of instructions such as arithmetic instructions, move data instructions, conversion instructions, control instructions and shift instructions.

Once having classified an instruction as being a specific type, the CPU can then determine after it has completely extracted the instruction from memory whether there is any further activity required by it in processing the instruction and hence the CPU can return automatically to extract the next instruction when no further activity is required. During the extraction operation, the CPU is operative to transmit control signals to the SU which signal the unit that the CPU is supplying the necessary control information and/or necessary operand data required for the SU to execute the scientific instruction.

Also FIGS. *4a* through *4d* show in detail the circuits which generate some of the control signals which are involved in processing the scientific instructions in accordance with the present invention. FIG. *4a* shows the logic and storage devices which are operative to signal a transfer of binary signals representative of op-code and control information characters to the SU. As seen from FIG. *4a*, these circuits include a pair of flip-flops 302-18 and 302-20 with associated logic and gating circuits 302-7 through 302-19 and 302-21 through 302-25 arranged as shown. The logic gating circuits 302-26 through 302-32 are operative to generate control signals specifying that the scientific instruction has a FMA format and these signals are applied to the flip-flop 302-18.

The control signal FSIVS10 is generated by the logic circuits of FIG. *4a* during any one of three CPU cycles of operation. The signal is generated during an A cycle of operation (i.e., signal JFACY10 is a binary ONE) at a time defined by signal CT210 when the instruction is determined not to be in the FMA format (i.e., signal JFMA420 is a binary ONE) or the CPU is not processing instructions in a four character mode (i.e., signal JFMA420 is a binary ONE), the SU is not busy (i.e., FUBSY00 is a binary ONE) and the upper three bits of the op-code stored in the I register equals 0 (signal IIUE010 is a binary ONE). The last mentioned signal indicates that the op-code character has an octal value between zero and seven.

The signal FSIVS30 is also generated when during a B cycle of operation (i.e., signal JFBCY10 is a binary ONE). When the SU is not busy (i.e., signal FUBSY00 is a binary ONE) and the instruction has a FMA format and the CPU has been set to process instruction in a four character mode (i.e., signal JFMA410 is a binary ONE).

Lastly, the CPU generates signal FSIVS30 during an S1 cycle of operation at a time defined by signal CT410 when the SU is not busy (i.e., signal FUBSY00 is a binary ONE), and the op-code character had not been previously sent to the SU by the CPU (i.e., signal FPIVS00 is a binary ONE). When flip-flop 302-18 is switched to its binary ONE state, it generates signal FSIVS30 which is forwarded to the SU via one of a plurality of interface lines as described herein. It will also be noted from FIG. *4a* that signal FSIVS10 is operative to cause flip-flop 302-20 to be set to its binary ONE state during either an S1 cycle (i.e., signal JES1C10 is a binary ONE) or during an A cycle (i.e., signal JFSCY10 is a binary ONE) or during a B cycle when signal JFBCY10 is a binary ONE. The flip-flop 302-18 is reset a clock pulse later via AND gate 302-17 while flip-flop 302-20 is reset during the beginning of a V3 cycle at which time signal JFV3C10 is a binary ONE. The V3 cycle as explained herein constitutes an initial or extraction cycle which the CPU enters when it has completed its processing of the scientific instruction. The A and B cycles are cycles used to fetch A addresses and B addresses respectively of the operands being processed. During normal operation, a signal IOCVS66 is a binary ONE indicating that the op-code character in the I register is a legal op-code. The signal IILE710 is a binary ONE when the op-code bit pattern stored in the I register corresponds to an octal 07. The signal FPIVS10 is applied to the circuitry of FIG. *4b*.

FIG. *4b* shows circuits used to signal the SU in advance, that it is to process a scientific instruction and to signal the SU that it is applying or transferring operand information, such as operand addresses or operand data to the SU as required to process a particular scientific instruction. In greater detail, FIG. 4d disclosed two flip-flops 302–52 and 302–65. The flip-flop 302–52 is switched to its binary ONE state when the CPU transfers a scientific op-code character from the input/output register 301 to the op-code I register of the CPU. More specifically, when an op-code character has been loaded into the I register in response to a subcommand signal IIFN410 during an A cycle of operation (i.e., signal JFACE10 is a binary ONE), at a time period defined by signal T3CT310, amplifier 302–41 forces signal IIFM410 to a binary ONE. This happens provided signal IIFN41B is a binary ONE. This signal is a binary ONE when the op-code stored in the I register does not contain an "item mark" indicating that it is an op-code which the CPU can execute directly. It will be appreciated that coding an op-code with an "item mark" inhibits the CPU from executing it and instead causes it to trap a software facility which is operative to translate the op-code via a software routine. Thus, signal IIFN41B will normally be a binary ONE.

An AND gate and amplifier circuit 302–46 forces signal MN4ISI0 to a binary ONE when the op-code character in the N register 301 specifies an operation to be executed by the SU. That is, the signals MM46 through MM44 will be binary ZEROS and MM43 will be ONE when the N4 portion of register 301 contains a "scientific op-code." It will be noted that signals IIFM410 and MM4ISI0 are combined within an AND gate and amplifier circuit 302–50 and together cause the generation of an early warning signal FCEWS30. This signal is immediately forwarded to the SU as soon as a scientific op-code character has read out in register 301 and decoded by the CPU. This early forwarding of a signal to the SU allows it to return quickly to an initial state which the SU signals to the CPU by forcing signal FSF1C40 to a binary ZERO. Signal FSF1C40 causes an AND gate 302–49 to hold flip-flop 302–52 in its binary ONE state until the SU has returned to its initial state since normally signal SFCM010 is a binary ONE. Thus, when the SU returns to the F1C cycle, it in turn resets flip-flop 302–52 to its binary ZERO state. The signal FCEWF10 is also forwarded to the SU via an AND gate and amplifier circuit 302–53.

The flip-flop 302–65 is switched to a binary ONE state when the CPU has signalled that it had previously sent the op-code or other control information to the SU (i.e., signal FPIVS10 is a binary ONE) and that it has transferred some characters in the form of an operand to the scientific unit (i.e., signal FTRSC10 is a binary ONE) and this transfer occurred when the CPU was in an S1 cycle of operation (i.e., signal JS1CV52 is a binary ONE). As explained herein, the signal FTRSC10 will be generated when the CPU is processing a scientific instruction having an FMA format (i.e., it has an op-code of 07 which causes signal IFMA012 to be a binary ONE) and the control character (V2) stored in the W register 302–3 is coded to specify a memory to register type of operation (i.e., signal FTRSC1A is a binary ONE). The flip-flop 302–65 is reset to its binary ZERO state one clock pulse later via AND gate 302–64 in response to clocking signal PDA.

Figure 4A:
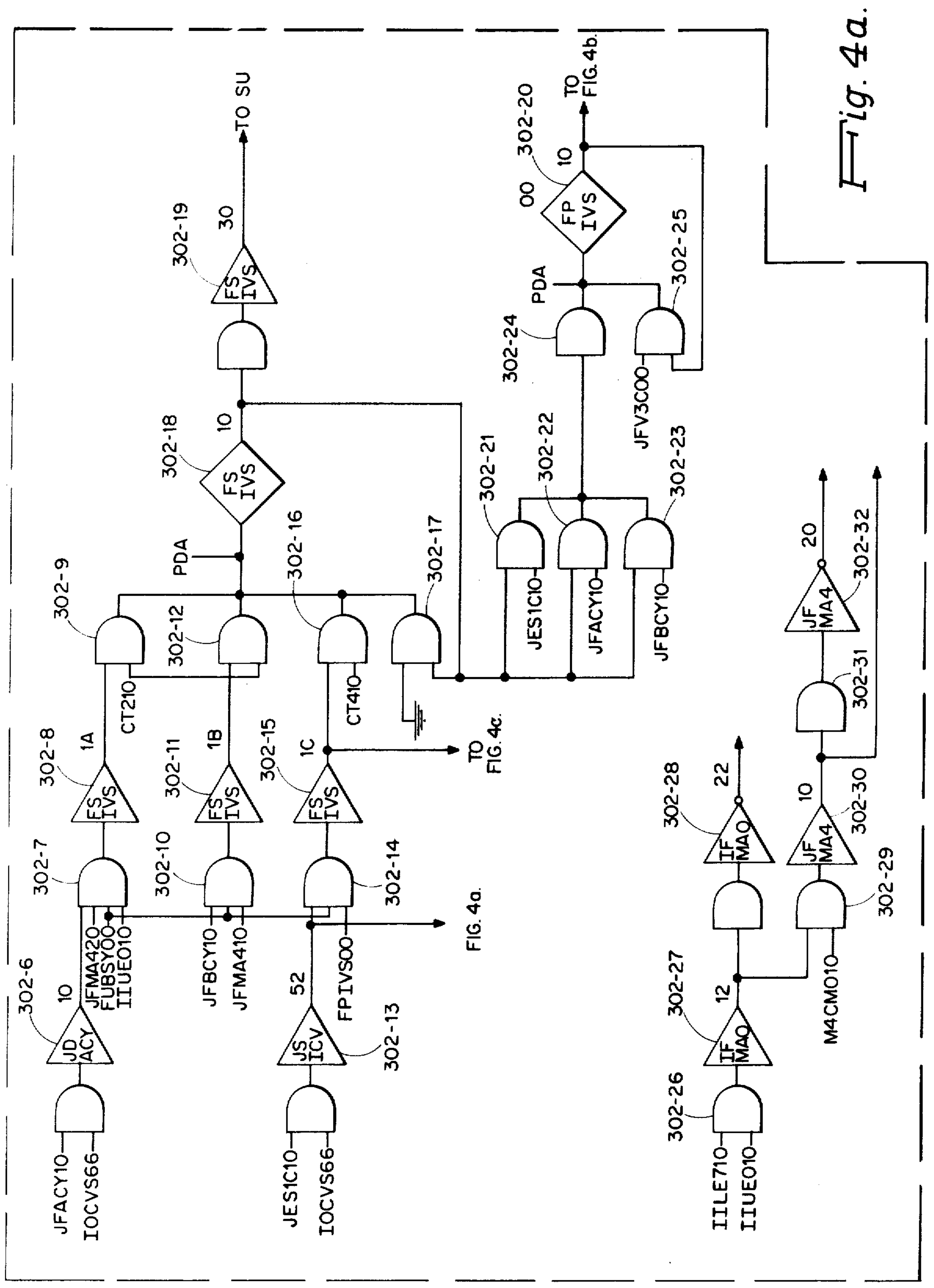
FIGS. 4*a* through 4*d* show in greater detail the various sections of the clock and cycle control circuit of the central processing unit of FIG. 3.
Figure 4B:
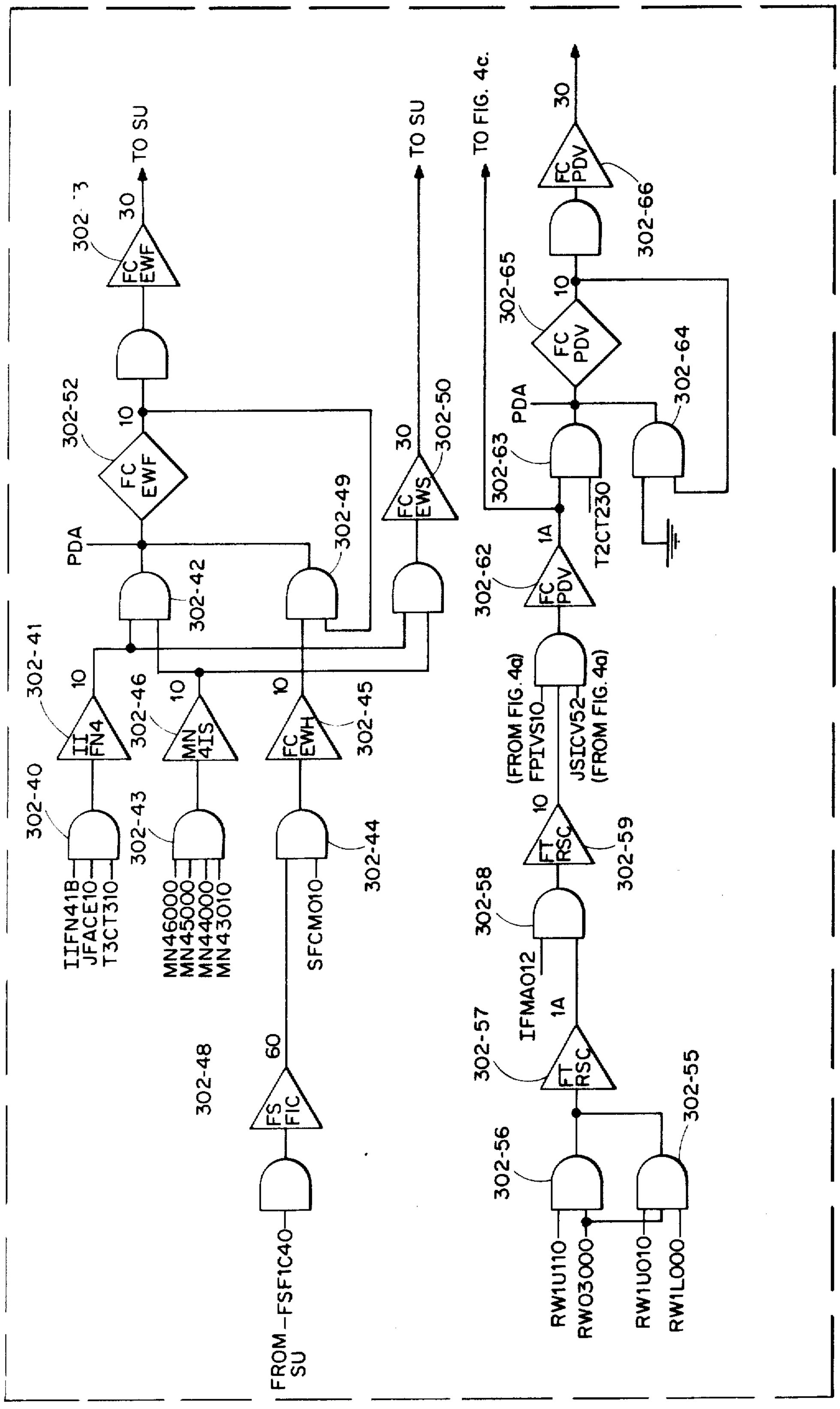
Figure 4C:
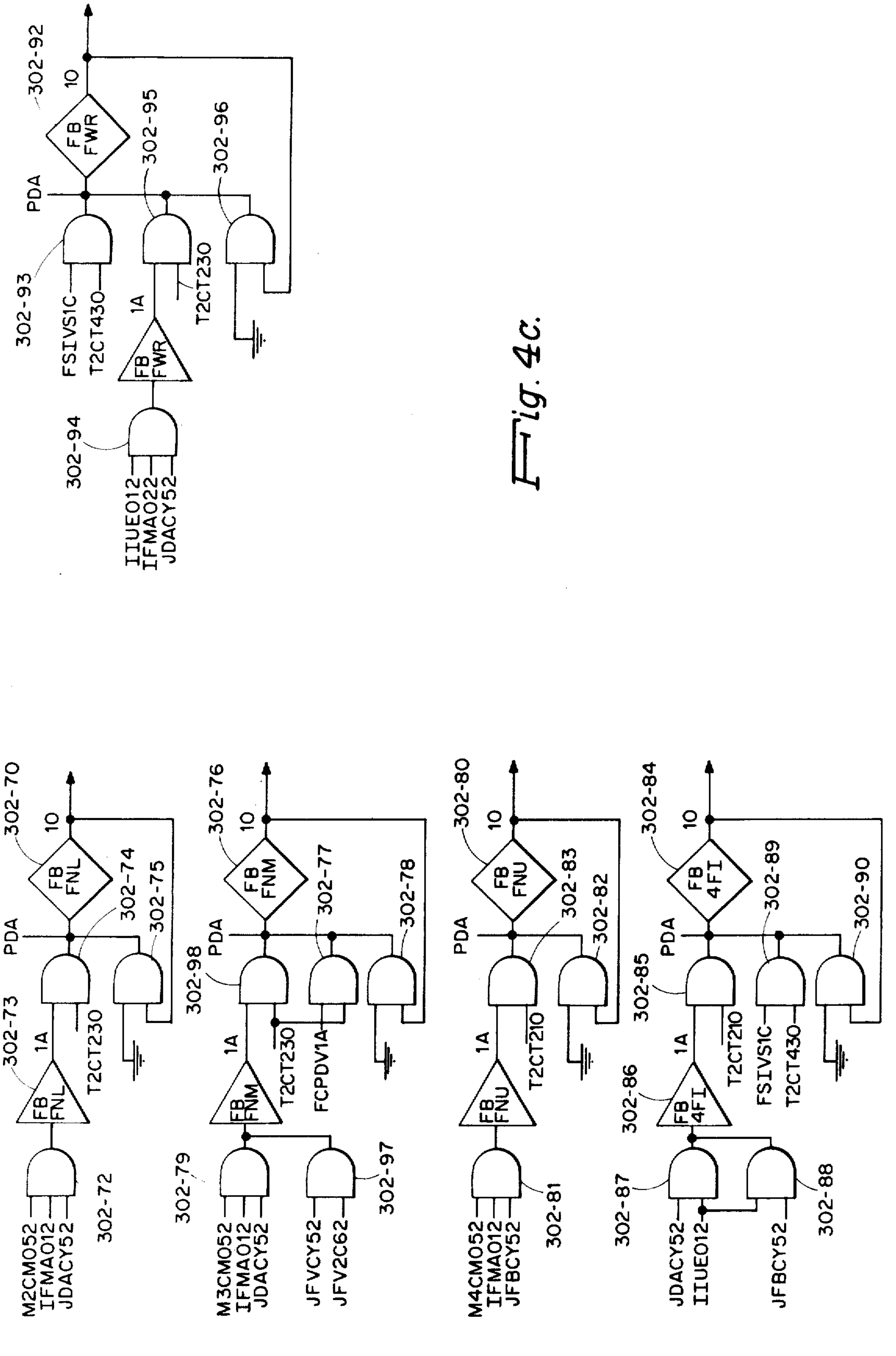

FIG. 4c shows the logic circuits and flip-flops of the cycle control which provide the circuits appropriate transfer control signals which condition the multiplexer circuit 305 of FIG. 3 to transfer control information and operand data to the SU properly positioned for all types of instruction formats, all cases of character modes and for different operating status of the SU (i.e., whether it is busy or not busy executing instructions). Obviously other sets of signals will also generate the same transfer signals. Only those circuits involved in processing instructions in accordance with the present invention are shown in the Figures. It is seen that flip-flop 302–70 forces transfer signal FBFNL10 a binary ONE during an A cycle of operation (i.e., signal JDACY52 is a binary ONE) when the CPU is set to operate in a two character mode (i.e., signal M2CM052 is a binary ONE) and when the CPU is processing a scientific instruction having a FMA format (i.e., signal IFMA012 is a binary ONE). The flip-flop 302–70 is reset one clock pulse later via an AND gate 302–75 in response to a PDA signal. The signal FBFNL10 conditions the multiplexer circuit 306 to apply the contents of the N2 and N1 sections respectively of register 301 to lines FNW18 through FNW13 and lines FNW12 through FNW7 of the SU bus as shown by FIG. 3.

Flip-flop 302–76 switches to a binary ONE state in response to timing signal T2CT230 and signal FCPDV1A from the circuits of FIG. 4b. The signal FBFNM10 generated by flip-flop 302–76 causes the multiplexer circuit 306 to apply the contents of sections N3 and N2 respectively of register 301 to lines FNW18 through FNW13 and lines FNW12 through FNW7. Additionally, flip-flop 302–76 is switched to a binary ONE via an AND gate and a amplifier circuit 302–79 during an A cycle (i.e., signal IDACY52 is a binary ONE) when the CPU is a three character mode (i.e., signal M3CM052 is a binary ONE) and when the CPU is processing a scientific instruction having a FMA format. The flip-flop 302–76 is also reset one clock pulse later via an AND gate 302–78.

The flip-flop 302–80 is switched to its binary ONE state when the CPU is in a four character mode (i.e., signal M4CM052 is a binary ONE) when the instruction being processed has a FMA format (i.e., signal IFMA012 is a binary ONE) during a B cycle operation (i.e., signal JFBCY52 is a binary ONE). The signal FBFNU10 generated by flip-flop 302–76 causes the circuit 306 to apply the contents of the sections N4 and N3 of register 301 to lines FNW18 through FNW13 and lines FNW12 through FNW7. The flip-flop 302–80 is reset to a binary ZERO state via AND gate 302–82 one clock pulse later, in response to a PDA signal. A plurality of AND gates 302–85 through 302–88 arranged as shown causes the flip-flop 302–84 to switch to a binary ONE state in response to a timing signal T2CT210 upon decoding an op-code character between the values of zero and seven (signal IIUE012 is a binary ONE) during either an A cycle of operation (signal JDACY52 is a binary ONE) or during a B cycle of operation (signal JDFBY52 is switched to its ONE state upon receipt of a signal FSIVS1C from the circuits of FIG. 4a in response to a timing signal T2CT430. When in a binary ONE state, flip-flop 302–84 conditions multiplexer circuit 306 to apply the contents of the op-code register 302–1 on lines FNW24 through FNW19 as shown in FIG. 3. A clock pulse later, flip-flop 302–84 is reset to its binary ZERO state via an AND gate 302–40.

Similarly, an AND gate 302–43 switches flip-flop 302–92 to its binary ONE state in response to signal FSIVS1C and a timing signal I2CT430. Additionally, AND gates 302–94 and 302–95 switch to a binary ONE state when the op-code decoder circuit 302–4 has decoded an op-code having a value between zero and seven (i.e., signal IIUE012 is a binary ONE) when the instruction does not have an FMA format (i.e., IFMA022 is a binary ONE) during an A cycle of operation (i.e., signal JDACY52 is a binary ONE) in response to a timing signal T2CT230. Once set, the flip-flop conditions the multiplexer circuits 306 to apply upper and lower portions of the W register contents on lines FNW18 through FNW13 lines FNW 12 through FNW7 as shown in FIG. 3. Flip-flop 302–92 resets to its binary ZERO state a clock pulse later via AND gate 302–96 in response to a PDA clocking signal.

Figure 4D:
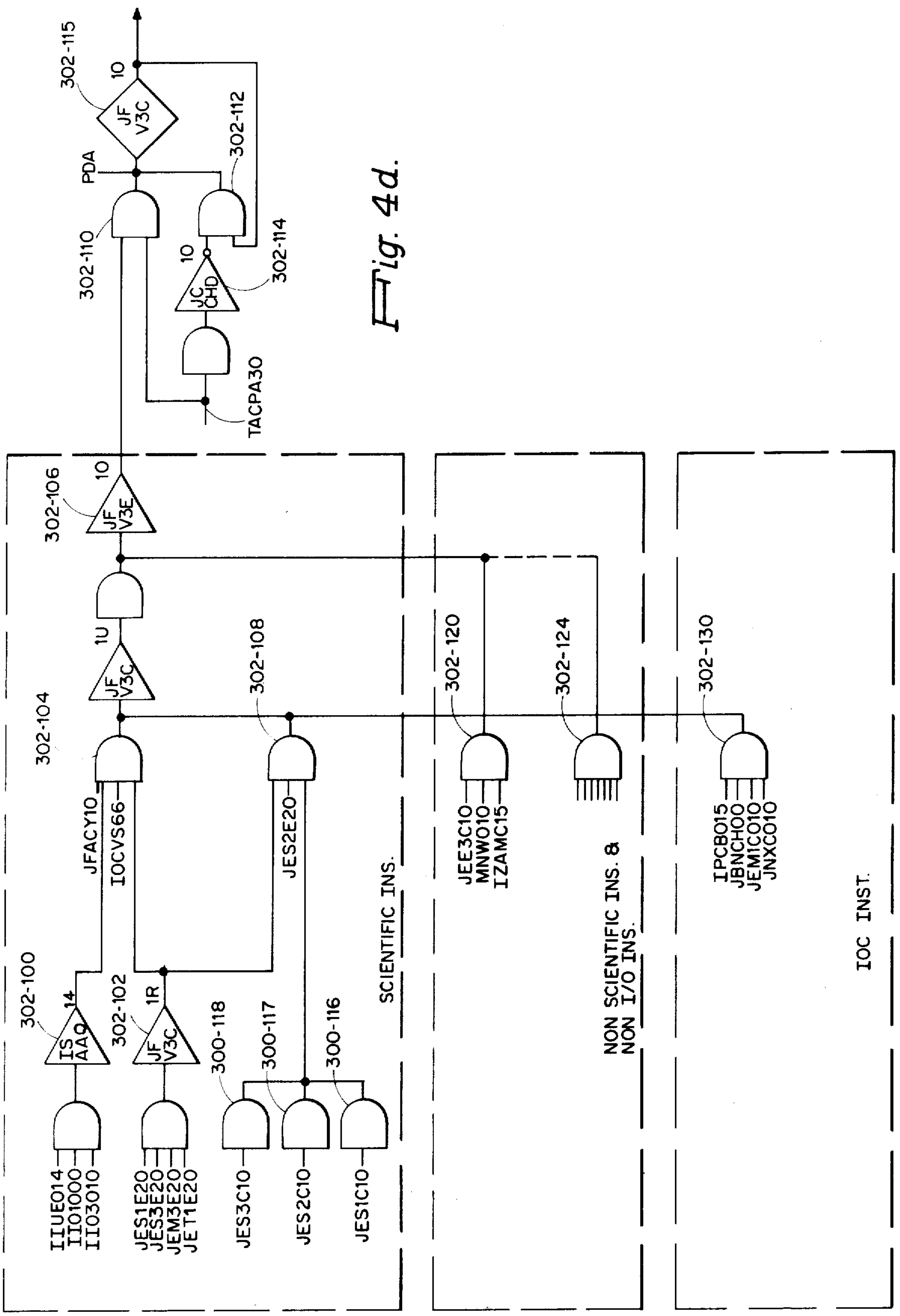

FIG. 4*d* shows one of the cycle flip-flops included in the cycle and control circuits of block 302–5. The flip-flop 302–115 defines an initial cycle of operation which is entered to begin the processing of an instruction. Only those logic circuits which are involved in illustrating the operation of the present invention are shown in FIG. 4*d*. These circuits include the gates 302–100 through 302–134 arranged as shown. The gate 302–124 indicates that there are other conditions associated with the processing of other CPU instructions which cause flip-flop 302–115 to be switched to a binary ONE.

The gates 302–100 through 302–107 are only active when the CPU is processing a scientific instruction as FIG. 4*d* indicates. The AND gate 302–120 is active only when the CPU is processing a CPU instruction such as a ZERO add, ZERO subtract or MCW. The gates 302–130 through 302–134 are active only when the CPU has been processing an input/output instruction. The reason for positioning control information characters in the manner described in connection with FIG. 4*c* will be best seen from FIG. 5 which discloses in greater detail the various portions of the SU.

Before describing the various portions which comprises the SU 500, reference is first made to the interface lines over which control and information signals are transmitted between the CPU and SU. As mentioned previously, lines FNW01 through FNW24 constitute an input bus to the SU. It is over this bus which instruction characters and operand information are transferred to the SU and stored in one or the more of its registers under the control of a cycle control section. The various interface signal lines and the description of the function performed by these lines are contained in the table herein to follow.

INTERFACE LINES

| Signal | Description |
|---|---|
| FNW0150 through FNW2450 | 24 lines by which the CPU sends information to the SU. The lines are held in a particular state until the SU acknowledges that it has taken the information. |
| FCEWF50 | Early Warning Signal Flopped line from CPU. |
| FCEWS30 | Early Warning Siginal Raw line from CPU. |
| FSODV30 | Scientific Data is Valid line from SU. |
| FSBSY00 | One line from the SU to signal the CPU that the SU is not busy. |
| FCPDV50 | One line from the CPU signaling the SU that the CPU sent Data to the SU. |
| FSMAD20 | One line from SU which indicates that the SU has been selected by the control panel R register display. |
| FCPDT50 | One line from the CPU which signals SU that the CPU has taken data. |
| FSIVS10 | One line from the CPU signaling the SU that the Op-code and variant characters applied to the input bus are valid for sampling. |
| FSODT10 | One line from the SU signaling the CPU that it has stored data in one of its registers. |
| FCSTP10 | One line from the CPU signaling the SU that the Stop Mode has been entered. |
| PPR011C through PPR061C | Six lines from the CPU to the SU by which the R register switches address the SU's control memory. |
| FPDPY30 | One line from the CPU signaling the SU to create a pseudo instruction so as to apply the contents of the SU's control memory to the output bus lines |
| FSFIC40 | One line from the SU to the CPU signaling the CPU that the SU is in an initial cycle. |

SU 500

Figure 5A:
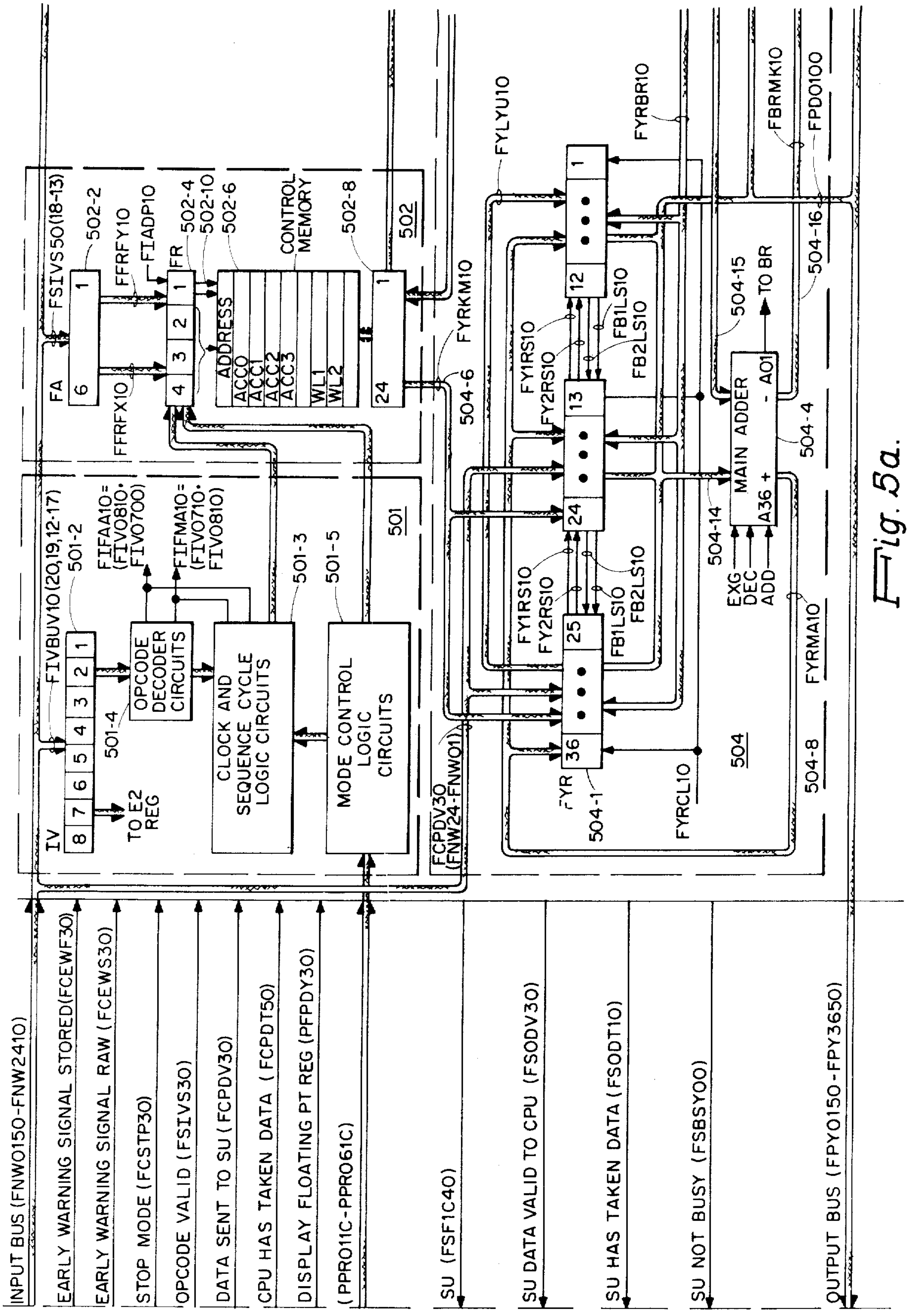
FIGS. 5*a* and 5*b* show in greater detail the various sections of the scientific unit of FIG. 1.
Figure 5B:
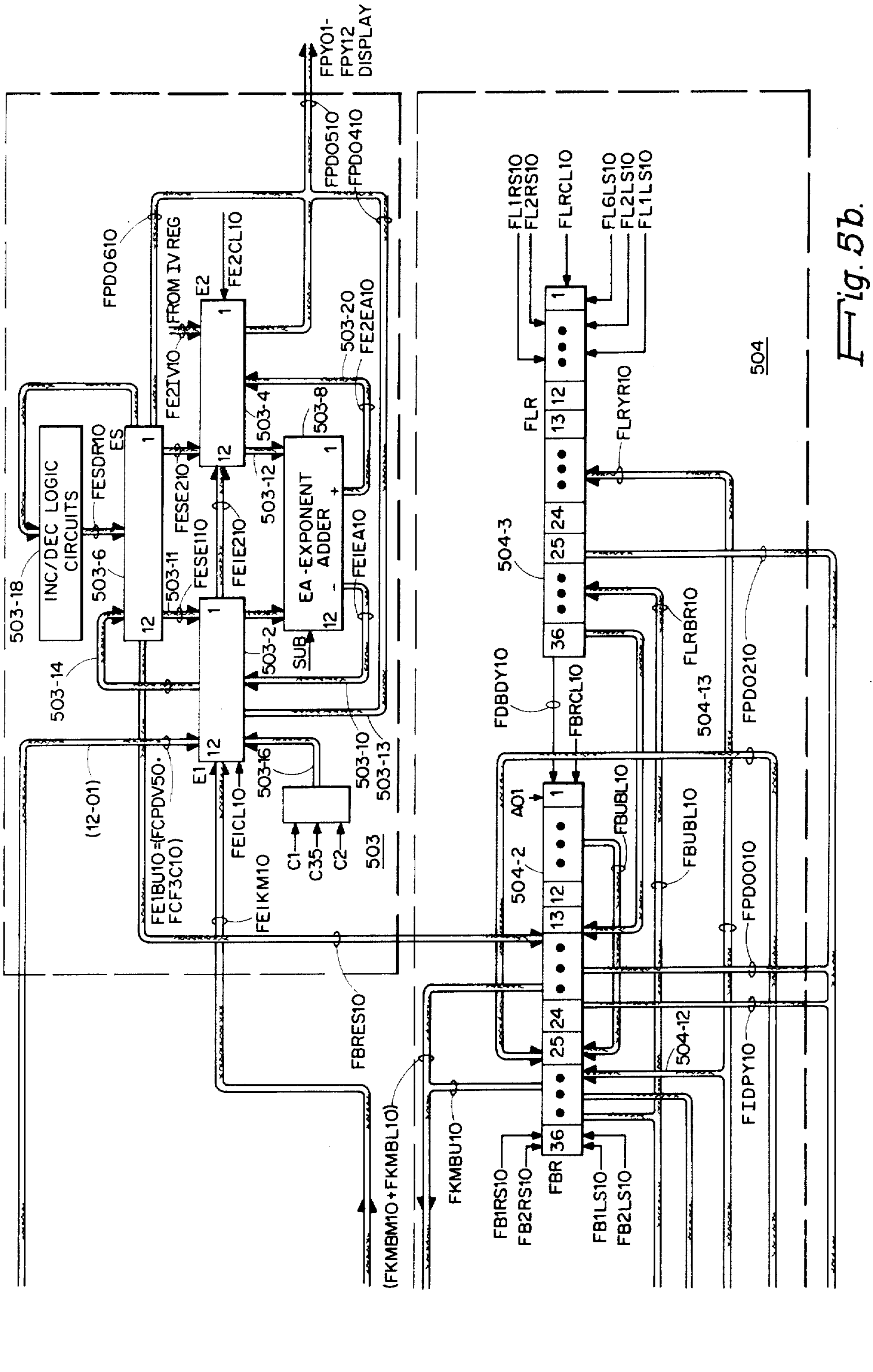

The SU comprises essentially five major sections. These sections include an input bus section, a control memory section 502, an exponent section 503 a mantissa section 504 and cycle control and diagnostic section 501 as shown in FIG. 5. The input bus section includes the input bus line FNW0150 through FNW2410 which apply the instruction and operand information signals to the various registers of the SU. These registers include the IV register 501–2, the FA register 502–2, the E1 register 503–2 and Y register 504–1. The IV register 501–2 in respnse to a signal FIVBU10 stores instruction information such as the low order two bits of the op-code. It also transmits control information from the input bus to the E2 register 503–4 and to the decoder circuits of the control section 501.

The address register 502–2 of the control memory section 502 in response to signal FSIVS50 is arranged to store the bits of the VI character applied to lines FNW18 through FNW13 which specify the address of the operands to be manipulated during the execution of a scientific instruction. These addresses are decoded by circuits included within the register and then in turn applied to the FR address register 502–4 of the control memory 502–6. In response to a subcommand signal FE1BU10 the E1 register 503–2 of the exponent section 503 stores exponent information appied to the line FNW12 through FNW01. The Y register 504–2 of the mantissa section 504 in response to signal FCPDV30 stores mantissa information applied to the lines FNW24–FNW01.

Considering the various sections in greater detail, it is seen that the control memory section 502 includes a control memory 502–6 which is operative to store accumulator information and intermediate result information as required during the execution of floating point operations by the SU. The floating point scientific instructions executed by the SU utilize floating point numbers each of which consists of a fixed length 48 bit word includes a 36 bit mantissa and a twelve bit exponent.

Because the floating point number requires a 48 bits, each operand or accumulator storage location in control memory 502–6 requires two consecutive control memory storage locations of the 24 bit wide control memory. When floating point number is stored in a "floating point accumulator" storage location, the twelve bit exponent portion is stored in the lowest addressable location of the two consecutive locations of the accumulator, the low order 12 bits of the mantissa portion is also stored in the lowest addressable location and the high order 24 bits of the mantissa occupy the highest addressable storage location of the two locations. As illustrated by FIG. 5, the control memory 502–6 provides facilitates for at least four floating point accumulator storage locations and two working locations.

As seen from FIG. 5, the control memory 502 has a single input data path which couples to the B register 504–3 of the Mantissa section. This path corresponds to path 504–4 and constitutes the only input to a control memory input output register 502–8. The control memory 502–6 also has a single address input path 502–10 from a control address register 502–14. The output data path from control memory 502 include the paths to the E1 register 503–2 of the exponent section 503 and the Y register 504–1 of the mantissa section 504. Accordingly, with the exception of exponent data, all operations performed by the SU use the Y register 504–1 as an output register.

Exponent Logic Section

All floating points calculations performed by the SU which affect or require modification of the exponent portion of a floating point number are performed by this section. As seen from FIG. 5, this section includes the E1 register 503–2, the E2 register 503–4, the ES register 502–6, and an exponent adder 503–8. The E1 register 503–2 provides storage for and permits manipulation of the exponent of a floating point number. The inputs to the E1 register 503–2 as mentioned previously come from the memory 502–6 and the input data bus lines FNW12 through FNW01. These paths are the only ones used by this section to obtain exponent information.

Additionally, the E1 register 503–2 receives signals from exponent adder 503–8 over a path 503–10, and input signals from the ES register 503–6 over a path 503–11 and input signals from the E2 register over a path 503–12. These input paths are used only during the actual manipulation of the exponent portion of a floating point number. The E1 register 503–2 feeds the output bus lines designated FPY01 through FPY12, via a bus 503–13, the exponent adder via a bus 503–14, the ES register 503–6 via a path 503–14 and the E2 register via a path 503–15. These three paths are used again only for exponent manipulation. Additionally, during exponent manipulation the E1 register 503–2 receives input signals via a path 503–16 which are coded to represent constants having values of 1, 2 and 35.

The E2 register 503–4 in addition to being used for exponent manipulation primarily functions as a storage for the results of exponent operations. As seen from FIG. 5, the E2 register couples to the IV register 502–2 in addition to the other exponent registers 503–2, and 503–6 as shown. The signals in the IV register 502–1, are loaded into the E2 register 503–14 and are used to determine the number of shifts to be performed by the exponent section during its execution of a BMS instruction. The output signals from E2 register are applied to the exponent adder 503–8 and to the bus lines FPY01 through FPY12.

The ES register 503–6 serves primarily as storage for exponent data when both the E1 and E2 registers are being used in conjunction with the exponent adder 503–8. In addition to receiving an input signal from the E1 register via bus 503–14, the ES register 503–6 has an input signal applied from incrementing/decrementing logic circuits of block 503–18 which can increment or decrement the contents of the ES register from one through four as required for exponent manipulation. The output signals of the ES register are also applied to lines FPY01–FPY12 as shown.

The exponent adder 503–18 is conventional in design and is operative to perform all add and substract operations involving exponent data. The adder 503–8 is operative to manipulate the quantities stored in the E1 and E2 registers and deliver the results to either the E1 register via path 503–10 or to the E2 register via path 303–20.

Mantissa Section

Similar to the exponent section, the mantissa section perform all floating point calculations involving the mantissa portion of a floating point number. This section includes a 36 bit Y register 504–1, a 36 bit B register 504–2, a 36 bit L register 504–3 and a main adder 504–4.

Each of the registers include three sections as illustrated by the arrangement of the Y register 504–1. As mentioned, the Y register provides one of the two output data paths from control memory 502–6. In addition to providing a transfer path between the mantissa section and control memory, the Y register 504–1 is also used for temporary storage of the mantissa portion of the floating point number which is received from the CPU via input bus lines FNW01 through FNW24. The Y register also receives input signals from the main adder 504–4 via a path 504–8, from the B register via a path 504–10 and from the L register 504–3. These input signals are transferred during only the initial manipulation of mantissa data. Similarly, the Y register contents are applied via the same path as inputs to the B register 504–2 and L register 504–3 as shown. The Y register receives subcommands for shifting the contents of the register either right or left by one or two positions.

The B register 504–2 provides the only input data transfer path between the mantissa section and control memory. It also provides an output signal to the output bus FPY01 through FPY36 which couples to the CPU and the register 504–2 is used in conjunction with the Y register 504–1 to manipulate the mantissa portion of floating point numbers. The B register 504-2 also receives input signals from the Y register via a path 504–12. Also, the register receives signals from the L register 504–3 via a path 504–13. This path is used to transfer the low order result stored in the L register to control memory 502–6 as required during the execution of certain floating point operations.

The L register 504–3 is primarily used to store the low order result of a floating point multiply operation. Additionally, this register is used for storing intermediate mantissa manipulations and for this reason receives signals from the Y and B registers as well as have its output signals applied to these registers. Additionally, the L register provides means which can shift its contents by six positions in response to a subcommand signal FF6LS10. The main adder 504–4 is arranged to perform all add and subtract operations upon the mantissa portion of the floating point numbers. Accordingly, the adder 504–4 receives input signals from the Y and B registers respectively via buses 504–14 and 504–15. The result produced by the adder 504–4 is applied to either the Y register 504–1 or the B register 504-2 via bus 504-8 or bus 504-16 as shown in FIG. 5.

Control Section 501

Various portions of the control section 501 will be described in greater detail. As previously mentioned, the IV register 501-2 which includes eight flip-flops is loaded from the lines FNW20, FNW19 and FNW12 through FNW7 when subcommand signal FIVBU10 is forced to a binary ONE. More specifically, bit positions 7 and 8 of the register 501-2 from bus lines 19 and 20 respectively which apply signals representative of the two low order bits of the op code character of the instruction extracted by the CPU. Bit positions 6-1 are loaded from bus lines 12-7 which apply signals representative of the V2 character of the instruction. The coding of the low order two bits for the formats is as follows:

FMA 00 01 11 = 07;
FAA 00 01 10 = 06;
BIM 00 01 01 = 05; and,
BMS 00 01 00 = 04.

As seen from the first table, each scientific instruction can have a number of fixed formats. The first format F/V1/V2, designated FAA, specifies floating point accumulator to floating point accumulator operations and has an op-code portion (F character), a X and Y accumulator portion (V1 character) and variant portion (V2 character). This type instruction only involves register to register transfers and as mentioned can be performed with maximum of overlap. Again, the op code character designates the type of format and the V2 character functions as an op code by designating to the SU the type of operation it is to perform.

The next format F/A/V1/V2 is an FMA format which specifies floating point memory to accumulator operations and has an op-code portion (F character), an A address (A address characters), a X and Y accumulator portion (V1 character) and variant portion (V2 character). This format is used for instructions which require both a main memory address and floating point accumulator addresses. Hence, these instructions can be used to perform memory to register transfers and register to memory transfers. The op code, V1 and V2 characters perform the same functions as in the FAA format.

The next two formats are designated BIM and BMS and define respectively binary integer multiply and binary mantissa shift instructions. The BMS instruction has the format F/V1/V2 where F character functions as an op code. The BIM instruction has the format F/A/B where F functions as an op code and the A and B addresses specify the storage locations in the memory system for storing the operands and result. Since the CPU cannot overlap the processing of this instruction, it is not particularly pertinent to this invention.

Signal FIVBU10 is forced to a binary ONE by a clock and sequence cycle logic circuits of block 501-3 when the SU is in an initial state (i.e., signal FCF1C10 is a binary ONE), the CPU has generated a sample op code and variant signal FSIVS30 and the SU is not executing an operator generated instruction from control panel 400 of FIG. 1 (i.e., signal FSDPY60 is a binary ONE). The contents of the IV register 501-2 remain stored until either the SU sequences to another cycle or a clear signal is received from the CPU The contents of the IV register 501-2 are applied to an op code and decoder circuits block 501-4. These circuits, conventional in design, provide one of a plurality of signals corresponding to signals FIVLOO10 through FLVL0710. Additionally, the circuits decode the bit contents of positions 7 and 8 and generate signals such as FIFAA10 and FIFMA10 which denote the format of the scientific instruction being processed (i.e., signal FIFAA10 = FIVL0810. FIV0700 and signal FIFMA10 = FIV0710. FIV0810).

Clock and Sequence Cycle Logic Circuits

Figure 6A:
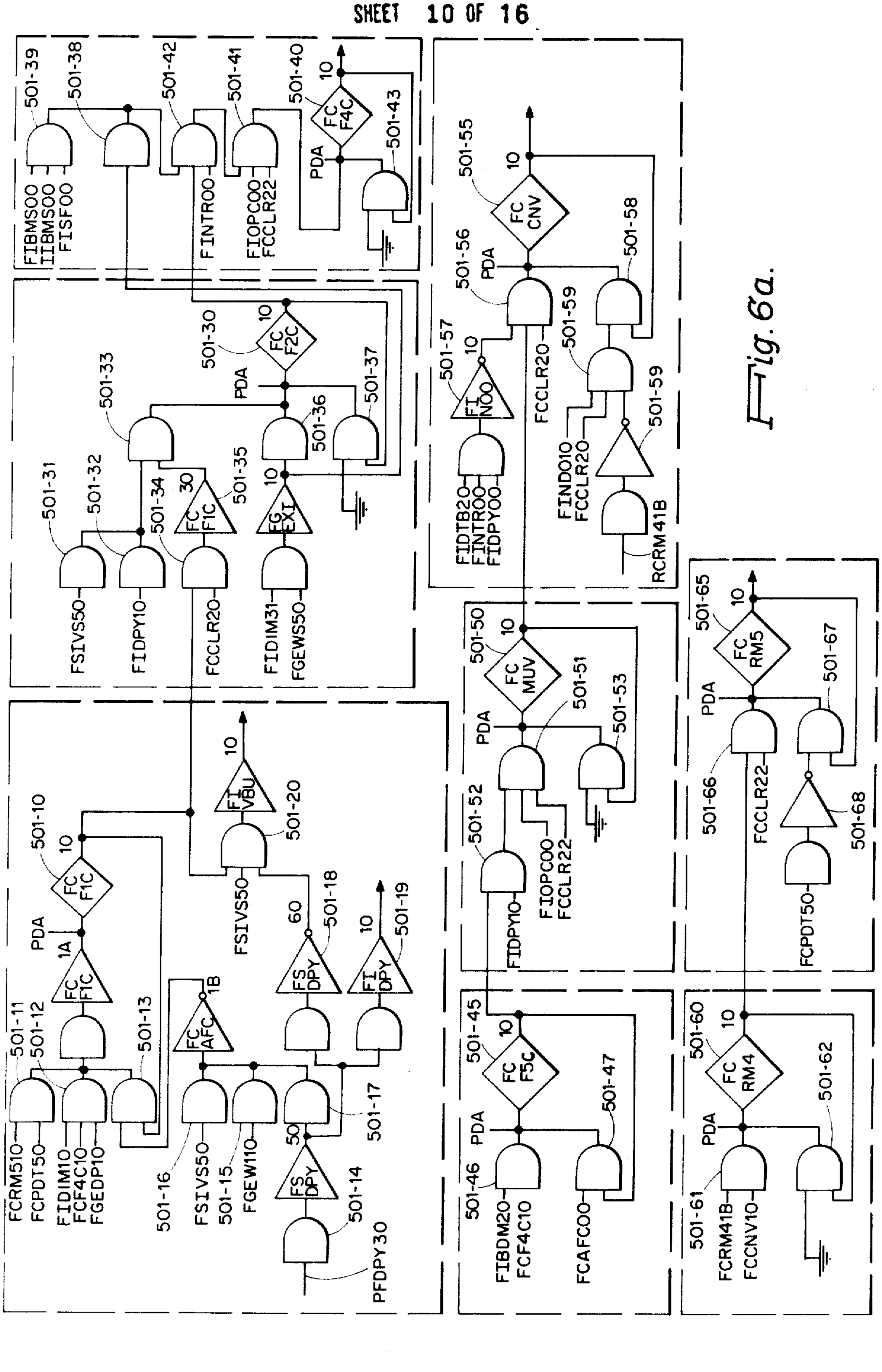
FIGS. 6*a* and 6*b* show in greater detail the clock and sequence cycle logic circuits and the mode control logic circuits of the scientific processing unit respectively of FIG. 5.

FIG. 6a shows the flip-flops which control the sequencing of the SU during its execution of a display command described in greater detail herein. While the same flip-flops are used during the SU's execution of other types of commands, only the signals pertinent to the display command are shown as inputs to the flip-flops.

There are eight flip-flops designated 501-10 through 501-65, each of which have associated input gating circuits arranged to set and reset the flip-flop as required during the execution of the display command. Specifically, flip-flop 501-10 whose state defines a F1 cycle of operation is arranged to be set to a binary ONE state via an AND gate 501-12 when the SU is not doing data processing operations but is in a diagnostic mode of operation (i.e., signal FIDIM10 is a binary ONE), it is in a F4 cycle of operation (i.e., signal FCF4C10 is a binary ONE) and the SU has completed execution of a diagnostic sequence (i.e., signal FGEDP10 is a binary ONE).

At the completion of execution of the display command, flip-flop 501-10 is again switched to its one state via an AND gate 501-11 when flip-flop 501-65 is a binary ONE (i.e., signal FCRM510 is a binary ONE) and a data valid signals has been received from the CPU (i.e., signal FCPDT50 is a binary ONE). The flip-flop 501-10 is reset to its binary ZERO state in response to an op code and variant valid signal sent by the CPU (i.e., signal FSIVS50 is a binary ONE), or when signal FDEW110 is forced to a binary ONE, or when the CPU forces signal PFDPY30 to a binary ONE. Each of these signals conditions an AND gate 501-13 to switch flip-flop 501-10. The binary ONE output signal FCF1C10 produced by flip-flop 501-10 is applied to various other portions of the system which include an AND gate 501-20 and an input gate 501-34 of flip-flop 501-30. The AND gate 501-20 generates the subcommand signal FIVBU10 which loads the IV register 501-2 from the input bus lines.

A next flip-flop 501-30 is switched to its binary ONE state via an AND gate 501-34 and 501-33 in response to signals FCF1C10, FCCLR20 and FIDPY10. Also, the flip-flop is switched to a binary ONE via a pair of gates 501-35 and 501-36 upon receiving an Eary Warning signal from the CPU (i.e., signal FGEWS10 is a binary ONE) when the SU is performing a diagnostic operation (i.e., signal FID1M31 is a binary ONE). The flip-flop 501-30 resets to its binary ZERO state one clock pulse later via an AND gate 501-37. The binary ONE output of flip-flop 501-30 is applied as an input to flip-flop 501-40 and causes it to be switched to its binary ONE state via a plurality of AND gates 501-35, 501-36, 501-41 and 501-42. The flip-flop 501-40 resets to its binary ZERO state one clock pulse later via an AND gate 501-43.

The binary ONE putput signal FCF4C10 produced by flip-flop 501-40 causes flip-flop 501-45 to be switched to it ONE state via an AND gate 501-46 during the execution of the display command (i.e., signal FIBDM20 is a binary ONE). Flip-flop 501–45 is reset via an AND date 501–47 when signal FCAFCOO is forced to a binary ZERO.

The signals FCF5C10 and FIDPY10 along with signals FIOPCOO and FCCLR22 switch flip-flop 501–50 to its binary ONE state via AND gates 501–51 and 501–52. An AND gate 501–33 resets the flip-flop to its binary ZERO state on clock pulse later. In a similar fashion, flip-flop 501–55 is switched to its binary ONE state when the SU is not executing a display command (i.e., signal FIDPYOO is a binary ZERO) when flip-flop 501–50 is in a binary ONE state, in the absence of a clear signal (i.e. signal FCCLR20 is a binary ONE). Switching occurs via an AND gate and inverter circuit 501–57 and an AND gate 501–56. The flip-flop 501–55 remains in its binary ONE state until the information being displayed has been properly aligned for transfer to the CPU (i.e., until signals FCRM41B is switched to a binary ZERO) which causes flip-flop 501–55 to be switched to its ZERO state via a pair of AND gates 501–58 and 501–59. At the same time, signals FCRM41B and FCCNV10 switch flip-flop 501–60 to its binary ONE state via an AND gate 501–61. This flip-flop is reset by an AND gate 501–62 one clock pulse later.

Following the switching of flip-flop 501–60 to its binary ONE state, an AND gate 501–66 causes flip-flop 501–65 to be switched to its binary ONE state. This flip-flop is reset to its binary ZERO state via a gate and inverter circuit 501–68 and AND gate 501–67 when the CPU forces signal FCPDT50 to a binary ONE. At the same time, this signal together with signal FCRM510 is operative to switch flip-flop 501–10 to its binary ONE state completely the cycling of the SU during its processing of the display command.

Mode Control Logic Circuits

Figure 6B:
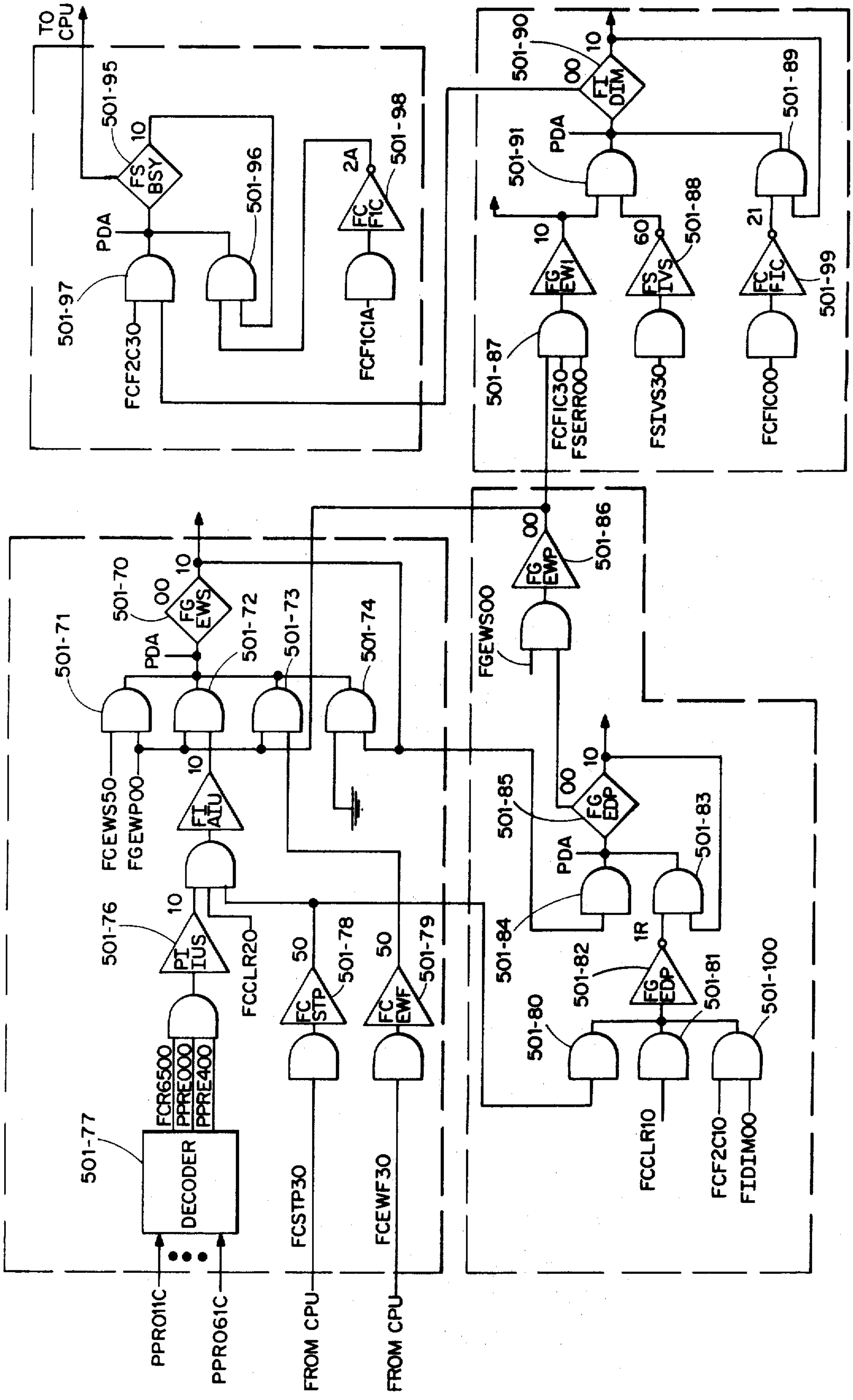

FIG. 6*b* discloses some of the storage devices and associated gating logic circuits which generate certain ones of the the signals applied to the flip-flops of the clock and sequence cycle logic circuits 501–3 of FIG. 6*a*. As seen from FIG. 6*b*, these circuits can be divided up into four sections. The first section includes the flip-flop 501–70 which is operative to generate signal FGEWS10 indicating that the SU has stored an indication of having received an early warning signal from the CPU. Specifically, when the SU is to process a display command, the CPU applies signals PPRO11C through PPR061C which originate from the control panel R register. These signals are decoded by a decoder 501–77, conventional in design. This decoder produces the signals which determine which floating point accumulator storage location of control memory 502–6 is to be accessed for displaying its contents. When signals representative of control memory locations 0 through 3 are to be displayed, an AND gate 501–76 forces signal PIIUS10 to a binary ONE which in turn switches flip-flop to its binary ONE state when the CPU has been placed in a stop condition by an operator (i.e., signal FCSTP30 is a binary ONE) and a clear signal has not been generated (i.e., signal FCCLR20 is a binary ONE). Accordingly, gates 501–78, 501–75 and 501–72 are operative to cause the switching of flip-flop 501–70 to its binary ONE state. The flip-flop 501–70 is also switched to its binary ONE state upon receipt of an early warning signal from the CPU (i.e., signal FCEWS50 is a binary ONE) when signal FGEWPOO is a binary ONE.

The signal FGEWPOO is generated by an AND gate 501–86 when both flip-flops 501–70 and 501–85 are in their binary ZERO states. The flip-flop 501–85 is switched to a binary ZERO when the CPU generates a stop signal (i.e., signal FCSTP30 is forced to a binary ONE). Resetting occurs via a gate 501–80, inverter circuit 501–82 and AND gate 501–83. The flip-flop is also reset when a clear signal FCCLR10 is applied to a gate 501–81. When flip-flop 501–70 is switched to a binary ONE state, it causes flip-flop 501–85 to be switched to its binary ONE state via a gate 501–84 as shown.

The signal FGEWPOO also causes the flip-flop 501–90 to be switched to a diagnostic or test mode of operation when the SU is in an initial state ( signal FCF1C30 is a binary ONE) and there is no error conditions (signal FSERROO is a binary ZERO) in the absence of the CPU generating a sample signal FSIV30. The setting of flip-flop 501–90 proceeds via an AND gate 501–87 and AND gate 501–91. The flip-flop is reset via an AND gate 501–89 and gate and inverter circuit 501–99 when signal FCF1COO is forced to a binary ONE.

The binary ZERO output side of flip-flop 501–90 is used to switch a SU busy flip-flop 501–95 to a binary ONE when signal FCF2C10 is a binary ONE. Switching occurs via an AND gate 501–97. The flip-flop is reset signalling that the SU is in a nonbusy state when signal FCF1CA is forced to a binary ONE. The resetting occurs via and AND gate 501–96 and gate and inverter circuit 501–98.

DESCRIPTION OF OPERATION

With reference to the figures previously described above, the operation of the system of FIG. 1 will now be described with particular reference to the flow charts of FIGS. 9 through 12. To begin with, the description of how the CPU 300 of FIG. 1 processes nonscientific instructions, scientific instructions and input/output instructions will be described. Certain conditions are assumed that will best illustrate the manner in which the system of FIG. 1 is able to overlap a plurality of operations involving the CPU, SU and IOC units of FIG. 1. For example, it is assumed that the CPU is operative to extract as a first instruction, one which specifies an input/output operation and that the resources required for the operation (e.g., read write channel (RWC), peripheral control unit and device) are all available and that the transfer will involve a buffered sector operation. It will be further assumed that following the extraction of the input/output instruction, the CPU is operative to extract a scientific instruction whose execution can be either fully or partially overlapped and that the extraction of this instruction is followed by the extraction of a nonscientific and non-input/output instruction executable by the CPU. The particular example envisioned is diagrammed in FIG. 7 and involves the operations diagrammed in FIGS. **8*a* and 8*b*.**

Referring to FIG. 3, the CPU is operative to fetch the sequence counter contents from control memory 304–1 and apply these to the S register 110 of the memory system 100. The address generation circuits 105 provide the required address signals from the address contained in register 110 and address four consecutive character storage locations with four modules, each included within a different memory interface. The four characters are then stored in the four sections of register 301. It is assumed that the CPU is operating in a four character mode wherein the A and B addresses, each include four characters. As indicated by the flow chart of FIG. 11, the CPU during the V3 cycle, also increments the sequence counter contents by one via the M register 304-5 and restores them to the control memory 301-1. Additionally, the CPU loads F character from the N4 section into the I register 302-1 by generating subcommand signal IIFN410.

At the completion of the V3 cycle, the CPU enters an A cycle of operation wherein it extracts the four characters of A address which indicate the starting storage location in the memory system 100 of the operand field where the data characters are to be transferred from. As FIG. 11 indicates, the four characters are fetched and loaded into the register 301 and then transferred to the ALU. Also, the contents of the sequence counter storage location are incremented by four and restored to control memory.

The CPU then enters a B cycle wherein it extracts several control characters, C1, C2/Ce and C3/C4 and the op code of the next instruction. THe control characters define the parameters pertinent to the processing of the peripheral data transfer instruction. The C1 character specifies the sector number and the rate assignment. The C2/Ce character is used to designate the sector over which the transfer is to take place and the type of transfer (i.e., direct or buffered). In the example, it will designate a buffered sector. The C2 character designates the logical address of the peripheral control unit required for the transfer and the direction of transfer. In this example, the C2 character specifies an output operation (i.e., transfer data from memory to the device) and the logical address of a peripheral control unit of a disk device such as that connected to sector 2C in FIG. 1.

The CPU forwards the control characters to the IOC 200 and generates a start IOC cycle subcommand signal APSEX10 signaling the 10C 200 to start processing the request. The control characters are stored in registers included within the control section 200-10 of the IOC 200 and decoded. The CPU stays in the B cycle until it receives a change cycle signal APNXC10 from the IOC200.

Referring to FIG. 2, it is seen that the signal APSEX10 conditions the set cycle circuits of the control section 200–10 to switch the cycle counter 200–12 to an E1 cycle. During the cycle, the control section 200–10 via the busy circuits 200–46 tests the RWC status and the time slot status of the selected sector by referencing the appropriate storage location within memories 200–31 and 200–34 and checking the status information bits stored therein. After determining that both resources are available for use, the IOC200 generates signal APNXC10 and enters an E2 cycle of operation. The CPU in response to the signal APNXC10 switches to an M1 cycle and waits for the IOC200 to again generate signal APNXC10.

During the E2 cycle, the I/O cycle control circuits 200–16 condition the peripheral command logic circuits 200–18 to switch a control line FDD of the sector 2C to a binary ONE and to apply the logical address of the peripheral control unit to the bus output lines of the sector. The line FDD signals all of the peripheral control units connected to the sector 2C that the bus contains an address. Only one of the peripheral control units will be assigned that address and will switch its address flip-flop.

The IOC200 then switches to an E3 cycle wherein it is operative to check the status of peripheral control unit. Specifically, the I/O cycle control circuits 200–16 condition the peripheral command logic circuits 200–18 to switch control line FKK to a binary ONE. This causes the control unit to return a coded response via status control line FSS. The circuits 200–46 are then operative to apply a signal to control 200–10 indicative of the control unit status. Since the peripheral control unit, in the example is available, the IOC200 is conditioned to enter an E4 cycle at which time it again generates signal APNXC10. During the cycle, the IOC 200 cycle control circuits 200–16 condition the logic circuits 200–18 to switch control line to a binary ONE. The control line FPP signals the peripheral control unit that the IOC200 has applied parameter information to the sector output lines. The parameter information could identify the particular device and is stored by the control unit. The IOC200 during the sending of parameter information is operative to detect a "word mark" in the register 200–75 signaling the end of instruction extraction. At that time, the IOC200 is operative to send signal APNXC10 to the CPU300.

Upon receipt of signal APNXC10, the CPU300 is operative to enter a P2 cycle wherein it reads out the A address from the A address counter location of control memory and checks the A address upon being transferred to the memory address register 110. Upon determining that the address is valid, the CPU300 signals the IOC200 by generating signal MAOK10. At this point, the CPU300 releases itself from processing the I/O instruction and processing is continued by the IOC200. Also during the P2 cycle, the CPU loads the A address contents into the read-write counter current location and starting location of control memory 304–1. At the completion of the cycle, the control circuits 302–5 condition the CPU300 to return to a V3 cycle of operation to begin extracting the next instruction. Referring to FIG. 4D, it is seen that the AND gate 301–130 returns the CPU to a V3 cycle by conditioning flip-flop 302–115 to be switched to a binary ONE during the CPU cycle of operation (i.e., signal TACPA30 is a binary ONE) when the peripheral instruction does not specify a branch operation, no branch is required since the IOC200 and resources are available (i.e., signals IPCB015 and IBNCHOO respectively are both binary ONES), the CPU is in an M1 cycle (i.e., signal JEMIC10 is a binary ONE) and the IOC–200 has sent signal APNXC10 (i.e., signal JNXC010 is a binary ONE).

Figure 11:
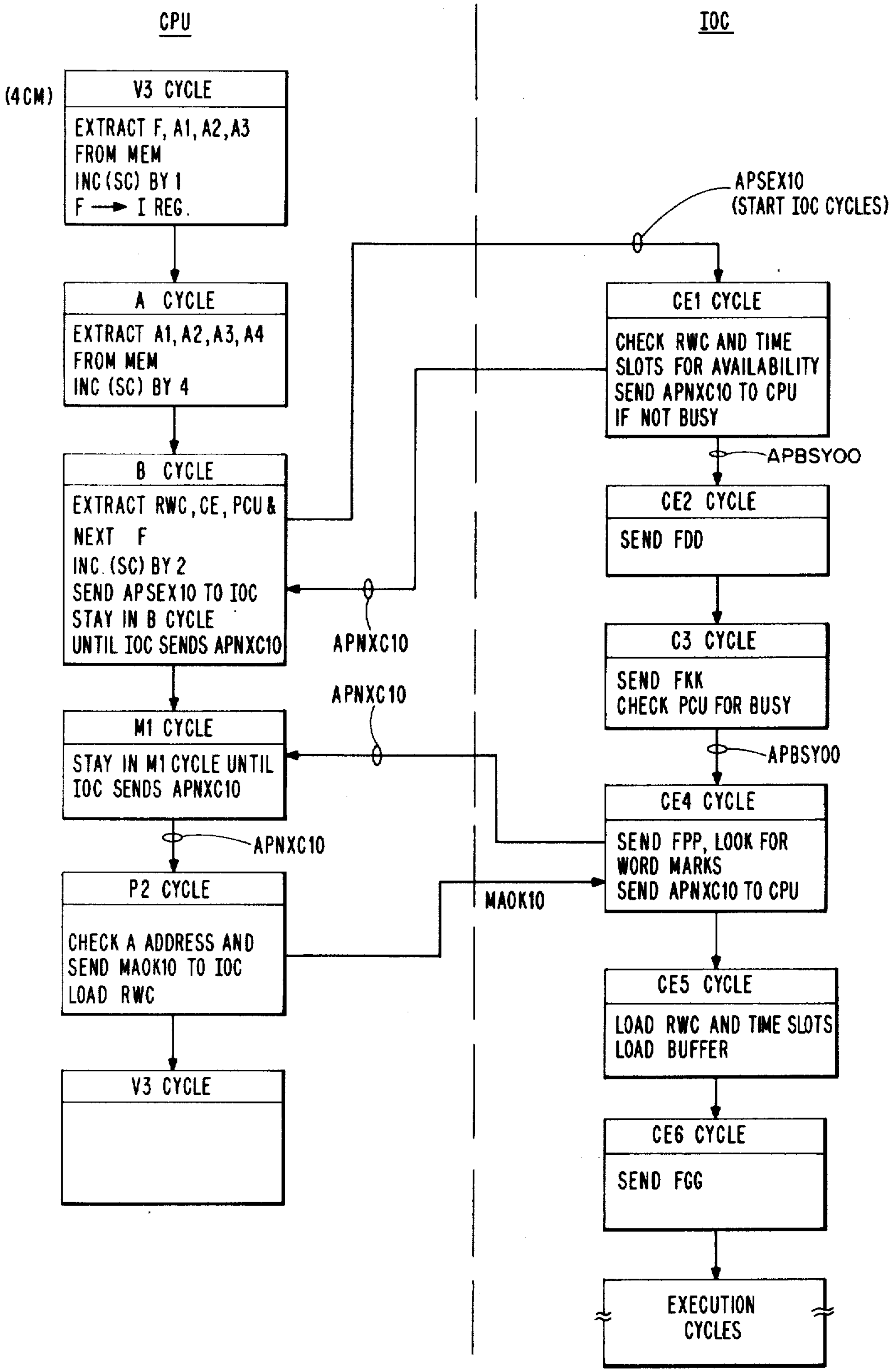
FIG. 11 illustrates the cycles of operations performed by the central processing unit in processing input/output instructions.

As illustrated by FIG. 11, the IOC200 enters an E5 cycle wherein it is operative to access the memory 200–31 to set the RWC selected by the instruction to a busy status and to set a mode bit to designate a buffered transfer. Also, the IOC200–10 sets the time slots requested by the current instruction to a busy status. When the appropriate location of memory 200–40 is addressed, the IOC200–10 loads the desired control word information into the MLR200–41 which is in turn written therein. Additionally, the IOC200 initiates a peripheral cycle wherein it accesses the memory system 100 and loads two buffers for sector 2C with eight characters to sustain the transfer rate of the output disk device and updates the information stored in memory 200–40. At the completion of the load operation, the IOC200 enters an E6 cycle, wherein the control circuits 200–16 condition the peripheral command logic circuits 200-18 to switch line FGG to a binary ONE. This signals the peripheral control unit that the IOC200 has applied the RWC code on the output sector bus lines. The control unit stores the code in a register for reference during the execution phase of the peripheral data transfer instruction. Thereafter, the IOC200 begins its execution of the data transfer operation.

Figure 7:
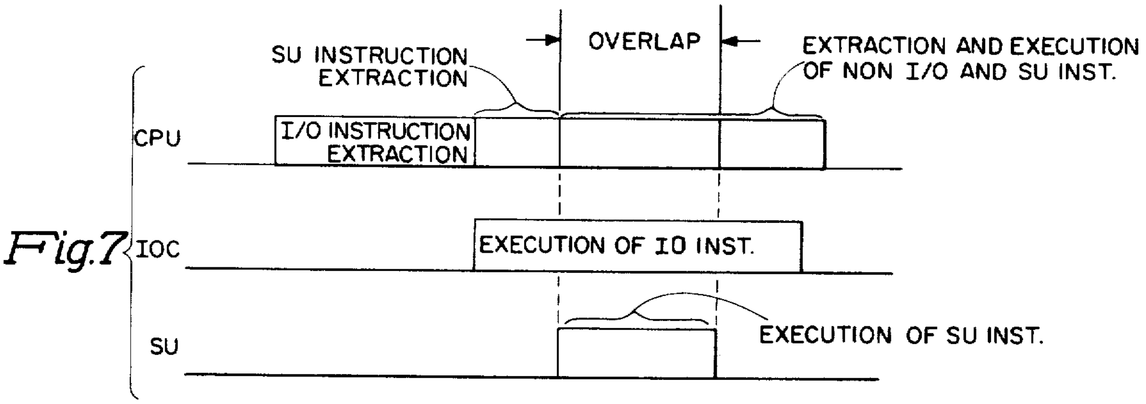
FIG. 7 illustrates diagrammatically the overlap in instruction processing achieved in accordance with the present invention.
Figure 10:
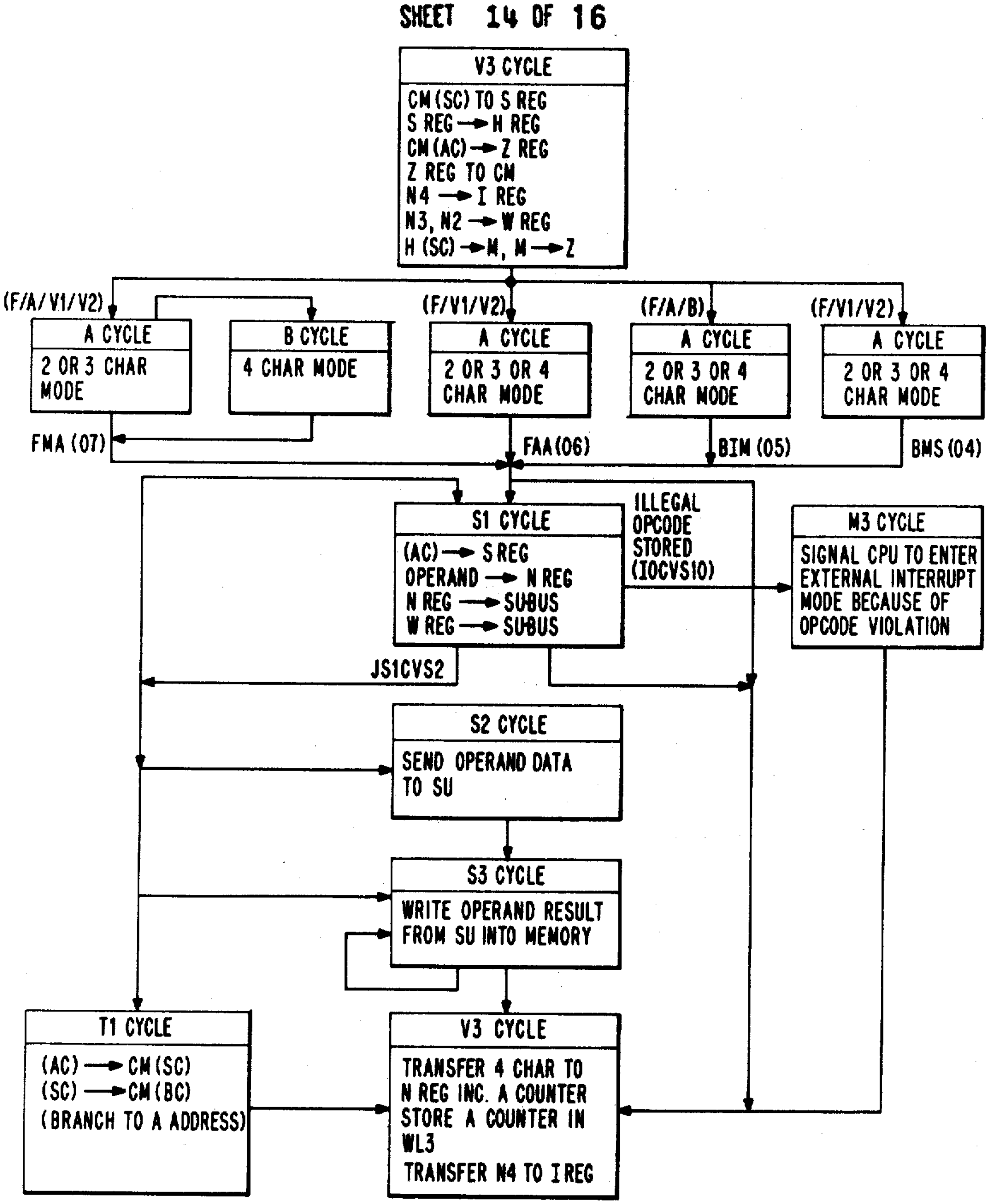
FIG. 10 illustrates the processing cycles performed by the central processing unit in processing scientific instructions having various formats.

Upon returning to a V3 cycle at a time coincident with the IOC 200 cycle E5, the CPU 300 now starts extracting the next instruction which as indicated by FIG. 7 is a scientific instruction. Referring to FIG. 10, it is seen that the CPU during a V3 cycle, transfers the contents of the sequence counter location of control memory 304–1 to the register 110 and reads out the four characters of the next instruction into register 301. THe op code character in section N4 of register 301 is stored in the I register in response to signal IIFN410 generated by control circuits 302–5. Also, the V1 and V2 characters in section N3 and N2 respectively of the N register 301 are stored in W register 302–3 in response to signal RWFNR10. This signal is forced to a binary ONE by signal FBFNM10 from flip-flop 302–76 of FIG. 4*c*. This flip-flop is switched to a binary ONE via AND gate 302-97 during any V cycle except a V2 cycle. The sequence counter contents are incremented by one via the M register and restored to control memory.

At the completion of the V3 cycle, the CPU enters an A cycle of operation during which it reads out the next four characters from the memory system 100.

From FIG. 4*b*, it is seen that upon entering the A cycle, the CPU300 is operative to generate an early warning signal FCEWS30 to the SU via AND gate 302–50 when it has determined that the op code character in section 4 of register 301 is a scientific op code which does not contain in "item mark." Thereafter, the CPU300 is operative to set flip-flop 302–52 via AND gate 302–42 and so held in this state until the SU switches to its initial state (i.e., signal FSF1C40 is a binary ZERO).

Referring to FIGS. 6*a* and 6*b*, it is seen that flip-flops 501–30, 501–70 and 501–85 are switched to the binary ONE states following the receipt of the early warning signal FCEWS50 from the CPU. The flip-flop 501–30 is switched from a binary ZERO to a binary ONE state via gates 501–35 and 501–36. Normally, flip-flop 501–90 of FIG. 6*b* will be a binary ONE state which causes signal FIDIM31 to be a binary ONE. Flip-flop 501–30 again switches to a binary ONE one clock pulse later in response to a PDA signal. At the same time, flip-flop 501–40 is switched to its binary ONE state via gates 501–38, 501–42 and 501–41. The major cycles defined by the binary ONE states of these two flip-flops enable the SU to return back to initial state when it is operating in a test mode. Since details relative to the SU's test mode of operation are not pertinent to the present invention, they will not be described in further detail herein.

Following the switching of flip-flop 501–40 to a binary ONE, the AND gate 501–12 of FIG. 6*a* is operative to switch flip-flop 501–10 to its binary ONE state which places the SU in an initial state. The signal FGEDP10 is a binary ONE since flip-flop 501–85 of FIG. 6*b* is a binary ONE. It is at this time that the CPU early warning flip-flop 302–52 is switched and remains held in this state. This, in turn, causes the CPU to transmit signal FCEWF30 to the SU which is, in turn, applied via AND gate 501–73 to early warning flip-flop 501–70 which holds the flip-flop in the binary ONE state. When the SU has returned to its initial state which corresponds to a F1 cycle of operation, it causes flip-flop 501–90 to be reset to its binary ZERO state along with flip-flop 501–95. The binary ONE output of flip-flop 501–95 is forwarded to the CPU and signals the CPU that the SU is in a condition or state to process the next instruction (i.e., is not busy).

Referring to FIG. 4*a*, it is seen that when the CPU is in an A cycle of operation (i.e., JFACY10 is a binary ONE, the I register contains valid or legal op code (i.e., signal IOCVS66 is a binary ONE), AND gate 301–6 switches signal JDACY10 to a binary ONE. Also, when the op code character specifies that the instruction does not have a FMA format and the CPU is not in a four character mode (i.e., signal JFMA420 is a binary ONE), the op code character has a value between zero and seven (i.e., signal IIUE010 is a binary ONE), the SU is not busy (i.e., signal FUBSYOO is a binary ONE) and signal JDACY10 is a binary ONE, AND gate 302–7 switches flip-flop 301–18 to a binary ONE state via AND gate 302–9 in response to timing signal CT210. This causes the CPU to transmit signal FSIVS30 to the SU. It is seen from FIG. 4*c* that signals JDACY52 and IIEU012 also cause flip-flops 302–84 and 302–92 to be switched to their binary ONE states. The signals FB4F110 and FBFWR10 condition multiplexer circuit 306 of FIG. 1 to apply the op code character and the V1 and V2 characters stored in the I register and W register respectively to the appropriate ones of the bus lines FNWO1 through FNW24. That is, the op code contents of register 302–1 are applied to lines FNW24 through FNW19, the V1 character stored in the upper section of register 302–3 is applied to lines FNW18 through FNW13 and the V2 character stored in the lower section of register 302–3 is applied to lines FNW12 through FNW7.

It is seen from FIGS. 5 and 6*a* that signal FSIVS30 causes the SU to load the op code, V1 and V2 character signals on the input bus lines FNW01 through FNW24 into the IV register 501–2, the FA register 502–2 and the E1 register 503–2. As mentioned, this results in the loading of bit positions 7 and 8 to conform to the two low order bits of the instruction op code applied to lines FNW19 and FNW20. The bit pattern of the V2 character is loaded into bit positions 1 through 6 of the SU IV register. Additionally, the bit pattern of the V1 control character applied to lines FNW18 through FNW13 is stored in the FA register. As mentioned, the V1 character specifies the two accumulator storage locations in control memory 502–6 which are to be manipulated during the execution of instructions having a FAA format.

As seen from the flow chart of FIG. 10, the CPU returns immediately to a V3 cycle of operation wherein it is operative to extract the next instruction. This also occurs immediately when the CPU has processed a scientific instruction having a BMS format as illustrated by FIG. 10. From FIG. 4*d*, it is seen that when the CPU detects that the op code character specifies either a BMS or FAA format instruction, AND gate 302–100 forces signal ISAA014 to a binary ONE. Since the CPU is operating in an A cycle of operation (i.e., signal JDA- CY10 is a binary ONE), the op code is valid (i.e., signal IOCVS66 is a binary ONE) and it is not conditioned to be switched to any one of the cycles indicated in FIG. 10 (i.e., signal JFV3C1R is a binary ONE), AND gate 302–104 switches the V3 cycle flip-flop 302–115 to its binary ONE state via gates 302–106 and 302–110. The flip-flop 302–115 remains in the binary ONE state until signal RACPA30 is forced to a binary ONE.

When the scientific instruction being processed by the CPU is in the FMA format and specifies a memory to register transfer operation, or the SU unit signals that it is busy, the CPU is operative to enter a S1 cycle of operation until the SU is no longer busy or until the CPU has transferred the A operand characters to the SU. This can be seen from FIG. 10. When the CPU is operating in the four character mode and processing scientific instruction having a FMA format, the CPU is operative to store the op code character during the V3 cycle and fetch the four A operand address characters during the A cycle of operation. The CPU then enters a B cycle wherein it loads the A address counter storage location of control memory 304–1 with the A address via the ALU 305. The V1 and V2 characters read out into register 301 during the B cycle are appled to the bus lines FNWO1 through FNW24 along with the op code character. More specifically, referring to FIG. 4*a*, it is seen that the AND gate 301–10 is operative to force signal FSIV1B to a binary ONE during a B cycle (i.e., signal JFBCY10 is a binary ONE), in the four character mode when the op code indicates that the instruction has a FMA format (i.e., signal JFMA410 is a binary ONE) and when the SU is not busy (i.e., signal FUBSYOO is a binary ONE). The signal FSIVS1B in turn switches flip-flop 302–18 to a binary ONE which forwards signal FSIVS30 to the SU. At the some time, signals M4CM052, 1FMA012 and JFBCY52 cause flip-flop 302–80 to be switched to a binary ONE. Also, signals IIUEO12 and JFBCY52 cause flip-flop 302–84 to be switched to a binary ONE. The transfer signals FBFNU10 and FB4FI10 condition the multiplexer circuit 303 to apply the op code, V1 and V2 characters to the appropriate ones of the lines FNWO1 through FNW24. The SU in the manner described previously loads its registers in response to signal FSIVS30. The signal FSIVS10 causes flip-flop 302-20 to be switched to a binary ONE.

As seen from FIG. 10, the CPU enters a S1 cycle of operation wherein it fetches the A operand from the memory system 100 using the A address stored in the A counter location of control memory 304–1. The A operand is read into register 301 and then applied to the lines FNW01 through FNW24 of the SU bus. More specifically, referring to FIG. 4*b*, it is seen that signals FPIVS10, JS1CV52 and FTRSC10 cause flip-flop 302–65 to be switched to a binary ONE. The signal FTRSC10 is forced to a binary ONE, when the op code character indicates that the instruction has a FMA format (i.e., signal IFMO12 is a binary ONE) and when the register 302–3 stores a variant character code specifying a memory to register transfer (i.e., signal FTRSC1A is a binary ONE). Additionally, signal FCPDV1A causes flip-flop 302–76 to be switched to a binary ONE. The signals FBFNM10 and FCPDV10 generated by flip-flops 302–76 and 302–65 condition the multiplexer circuit 306 to apply the A operand to the SU bus.

Referring to FIG. 6, it is seen that the SU after returning to the F1 cycle after completing the execution of the F2 and F4 cycles is operative to process the FMA instruction as follows. Previously, when the CPU transmitted signal FSIVS30, the SU was operative to store the op code bits applied to lines FNW19 and FNW20 and the V2 character applied to bus lines 12 through 7. Also, the V1 character which specifies the accumulator address storage location of the result (Y accumulator address) and the other operand is loaded into the FA register 502–2 from lines 18 through 13. Since the X accumulator storage location is accessed first, the X accumulator address stored in register FA is also directly loaded into register FR thereby allowing the SU to access control memory during the next cycle (i.e., F2 cycle).

During the next cycle, the exponent of the floating point number (Xe) and the lower twelve bits of the mantissa portion of the floating point number (Xe) are transferred from control memory to the upper twenty-four bits of the Y register 501–1. The exponent (Xe) is also stored in the E1 register 503–2. During the next cycle (F3 cycle), the exponent portion (Ae) of the A operand fetched from the memory system 100 and the lower twelve bits of the mantissa portion (A1) of the floating point operand fetched from main memory system 100 are loaded into the input bus lines into the upper 24 bits positions of the Y register 504–1. As seen from FIG. 5, this occurs when the CPU forces signal FCPDV30 to a binary ONE. At the same time, signal FE1BU10 causes the exponent portion (Ae) to be loaded into the E1 register 503–2 from the input bus lines.

During the next cycle executed by the SU, it is operative to store the lower 12 bits of the mantissa portion (Ae) from the upper 12 bit positions of the Y register to the lower twelve bit positions. Also, the exponent portion (Ae) is stored in the ES register via path 503–14 and the E2 register is cleared to zeros by signal FE2CL10. During the next cycle, the upper 24 bits of the mantissa portion (Au and Am) are loaded from the input bus into the upper 24 bit positions of the Y register 504–1. During a subsequent cycle, the mantissa portion (Au, Am and Al) are loaded into the B register 504–2 via the main adder 504–4 from the Y register 504–1. Also, the Y address stored in the FA register 502–2 is loaded into the FR register 502–4.

During the following cycles, the upper portion of the mantissa (Au, Am) are written into the specified Y accumulator storage location in control memory 502–6. Also, the exponent portion (Ae) is applied from the ES register 503–6 to bit positions 13–24 of the B register 504–2 and the lower mantissa portion stored in the lower 12 bit positions of the B register are transferred to the upper 12 bit positions. Thereafter, the lower 24 bit positions of the Y accumulator storage location of control memory 502–6 is accessed and the exponent portion (Ae) and the lower 24 bits of the mantissa portion (Al) are written into the lower 24 bit positions of the Y accumulator in control memory 502–6.

It will be appreciated that the SU performs similar types of transfers when the SU is processing a scientific instruction with the FAA format. The difference, of course, is that the exponent stored in the accumulator storage location specified by the X address is referenced along with the mantissa portion stored therein and transferred to the accumulator storage location specified by the Y address stored in the FA register. Thus, no transfers of information occur from the bus into the SU as required by a scientific instruction specifying a memory to register operation having the FMA format.

Figure 8:
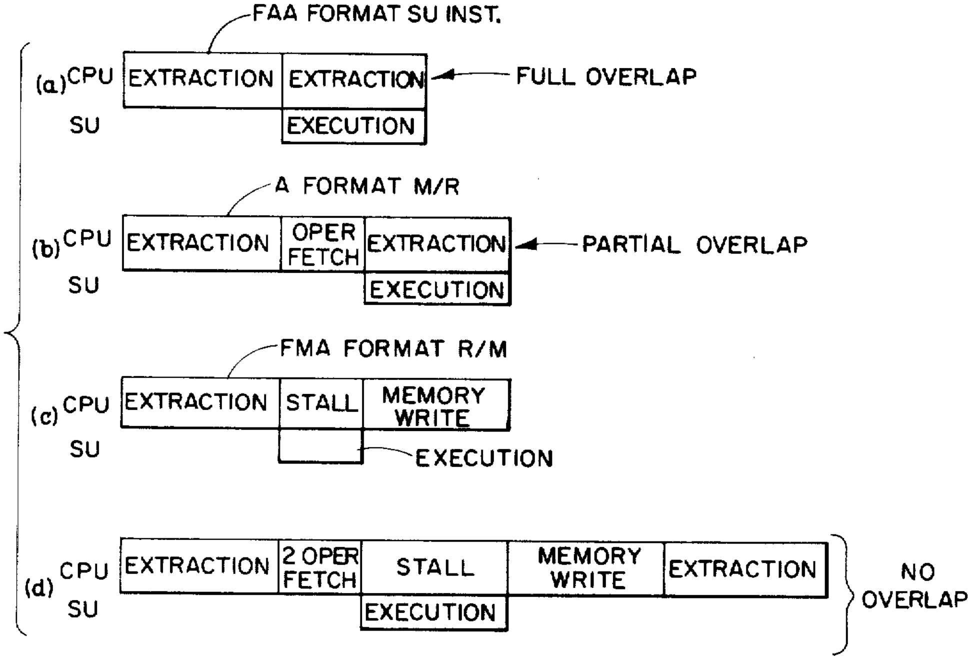
FIG. 8 illustrates diagramatically the sequence of processing phases of instructions performed by the scientific unit and main processing unit of FIG. 1 for different formats of scientific instructions.

It will be noted from FIG. 10 that as soon as the exponent and mantissa portions of the operand fetched from the memory system 100 have been transferred from the bus into the Y register 504–1, the CPU returns immediately to a V3 cycle of operation. With reference to FIG. 4*d*, it is seen that the flip-flop 302–115 is switched to a binary ONE via gates 302–116, 302–108, 302–106 and 302–110. As illustrated by FIG. 8*b*, there is some interval during which the CPU300 must fetch the operand before it begins extracting a next instruction. However, it will be noted from FIG. 8*a* that there is essentially no delay in the case of FAA format instruction and thus the CPU essentially is able to proceed from V3 cycle to A cycle to V3 cycle as illustrated in FIG. 10.

It is seen from the foregoing that the CPU300 can expeditiously process scientific instructions of various types with a minimal amount of time by including means for identifying the instruction to be processed as being within a certain class and for returning the CPU to a point it can begin extracting a next instruction immediately after it has extracted the information required for having instruction executed by the SU.

Referring to FIG. 7, it will be noted that the next instruction extracted from the memory system 100 in this example is a nonscientific and non-input/output instruction. By executing the series of cycles illustrated in FIG. 9, the CPU is operative to fetch the instruction, in a conventional manner, to perform the requisite addressing when required, and ready the system for its execution. Since this instruction is to be executed by the CPU, this will enable the three operations indicated in FIG. 7 to be overlapped in the manner shown.

Figure 9:
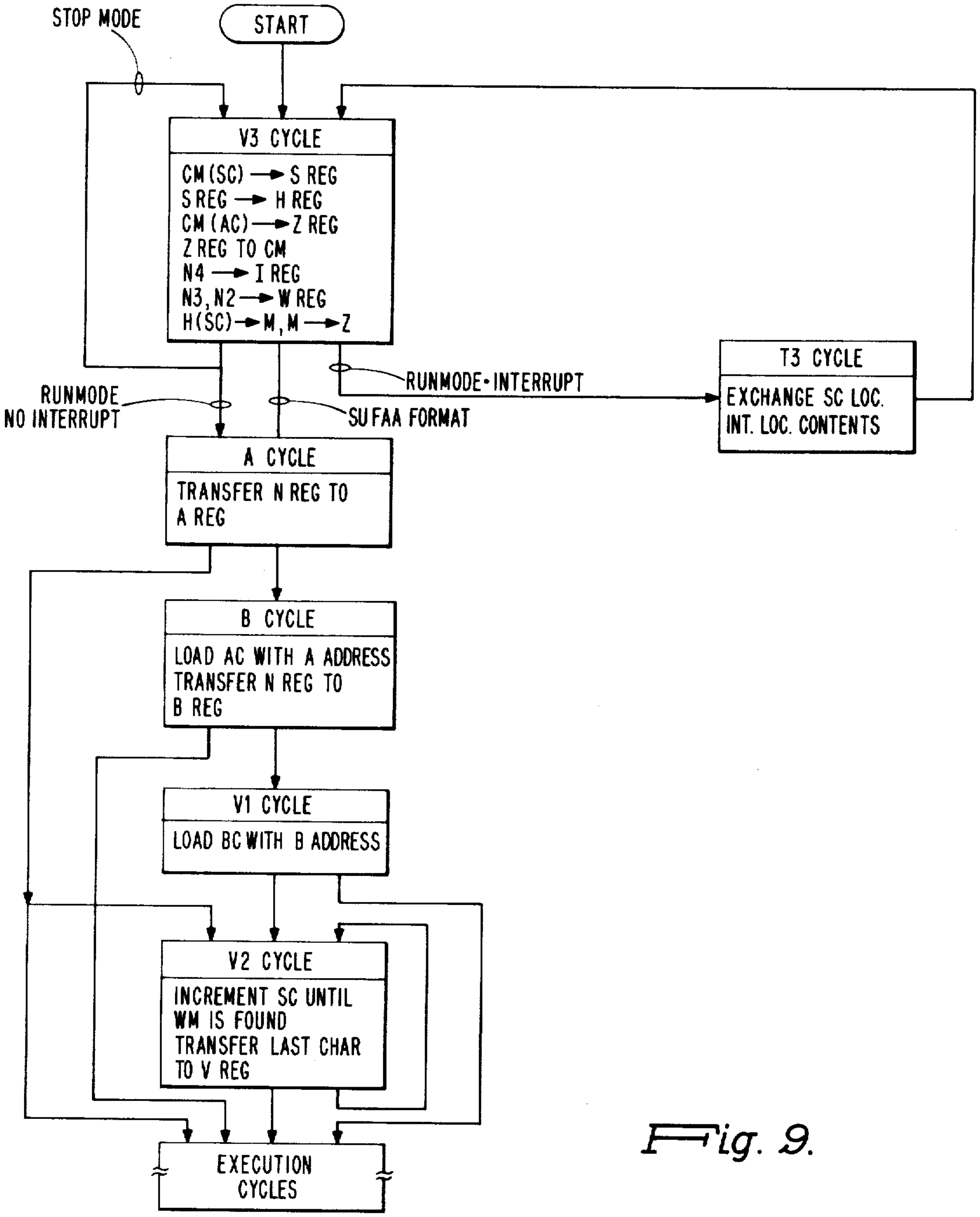
FIG. 9 is a flow chart illustrating the processing cycles performed by the central processing unit and processing non-scientific instructions.

Now the operations performed by the CPU will be described in greater detail with reference to FIG. 9. It is again assumed that the CPU is still operating in a four character mode. During a V3 cycle, the CPU is operative to transfer four consecutive characters read out of the memory system into the N register, increment the contents of the sequence counter location of control memory 304–1 and store it in a working location. Also, as illustrated by FIG. 9, the CPU stores the op code character is section N4 of the register 301 in the I register 302–1.

Further, the CPU loads the W register 302–3 with the V1 and V2 characters stored in the N3 and N2 sections of register 301. The CPU then enters an A cycle of operation where it is operative to transfer the next four characters of the A operand address to the ALU 305. This cycle is followed by a B cycle wherein the A counter storage location of control memory 304–1 is loaded with the A operand address from the ALU 305 and the B address stored in the 301 register are transferred to the ALU 305.

During a V1 cycle of operation, CPU loads the four characters of the B address into the B address storage location of control memory and enters a V2 cycle of operation. In this cycle, the CPU is operative to increment the contents of sequence counter location of control memory 304–1 for read out of subsequent variant characters of the instruction until the op code character of the next instruction is read out to the N register 301. When the CPU senses the "word mark" of the op code character, it switches to a first of a series of execution cycles required for executing the instruction. For additional examples illustrating the manner in which the CPU executes normal instructions, reference may be made to U.S. Pat. No. 3,344,404 titled "Multiple Mode Data Processing System Controlled By Information Bits or Special Characters," invented by Kenneth E. Curewitz, which issued Sept. 26, 1967, and is assigned to the assignee named herein.

The above example has illustrated the manner in which a data processing system in accordance with the present invention is able to maximize the overlapping of instruction execution by the subsystems included within the data processing system. Additionally, the above example illustrates the manner in which scientific instruction processing by a subunit coupled to the CPU is achieved with minimal modification to the existing system.

Display Command Execution

Some systems provide an operator with the capability of being able to access any one of a number of floating point storage locations to assist the operator in performing certain checking operations. In the system of the present invention, the CPU and SU each include means for providing a similar display facility without requiring the CPU to provide storage for floating point numbers.

In general, when an operator displays the contents of a specific floating point storage location, the operator first places the CPU in a stop mode by pressing the stop button located on the system control panel 400. This causes the CPU control circuits 302–5 to force stop signal FCSTP30 to a binary ONE and this signal is applied to the SU. Additionally, the operator also selects via the control panel 400 the address of the storage location to be displayed. This address is transmitted as signals PTR011C through PTR061C to the SU. As seen from FIG. 6*b*, the stop signal FCSTP30 together with the decoded address signals are operative to switch flip-flop 501–70 to its binary ONE state. This flip-flop by generating signal FGEWS10 conditions the SU to exit the diagnostic mode and return to a F1 cycle in the manner previously described. Thereafter, the SU 500 in response to a display signal PFDPY30 from the CPU executes a sequence of cycles shown in FIG. 12. This results in a transfer of the contents of the specified accumulator storage location to the S register of the CPU via output bus lines FPY015 through FPY36. The SU essentially processes the display command as a pseudo instruction wherein it returns the "result" to the CPU. The "result" is stored in the S register 110 for subsequent display by control display indicator circuits.

Considering the operation of the SU in greater detail, it is seen from FIG. 5 that the signals PPR011C through PPR061C are applied to the control logic circuits of block 501–5. These circuits as shown by FIG. 6*d* decode the address signals and apply control signals to the R register 502–4 of the control memory 502–6. More particularly, when signals corresponding to octal addresses of 41 through 57 are applied to the decoder circuit 501–77 it produces decode signals of 1, 2, or 3. These decoded signals designate which "accumulator storage" location in control memory 502–6 is to be accessed and which portion of the 48 bit floating point word is to be applied to the output bus for display on the control panel. These decoded signals, therefore, condition the FR register and other circuits within the SU to execute a sequence of cycles an appropriate number of times for read out of the desired portion of the floating point word.

The first cycle which the SU performs is the F1 cycle and this cycle is entered after the SU has completed a F4 cycle of operation following an exit from the SU's test mode of operation. More specifically, the AND gate 501-12 switches flip-flop 501-10 of FIG. 6*a* to its binary ONE state which causes the SU to enter the F1 cycle. During this cycle, the SU generates the subcommand signal FIADP10 which loads into bit positions 2 through 4 the FR register 502-4 the address of the accumulator location specified by the control panel switches decoded signals. Also the signal FSDPY60 inhibits the generation of signal FIVBU10 which inhibits the IV register 501-2 from being loaded from the bus lines.

At the completion of the F1 cycle, the SU via gates 501-32 and 501-33 is switched to an F2 cycle of operation. During this cycle, it generates subcommand signal FBRLR10 which transfers the low order result value stored in the L register 504-3 into the B register 504-2 and sets bit position one of the FR register 502-4 to address the upper 24 bit positions of the specified accumulator storage location. The SU is also operative to generate subcommand signals FE1KM10 and FYRKM10 which cause respectively the exponent (Ae) and middle portion (Am) of the mantissa stored in the accumulator storage location to be loaded into the Y register 504-1 and the exponent (Ae) to be loaded into the E1 register 503-2.

The SU then enters a F4 cycle of operation wherein it generates signal FYLYU10 which transfers the lower portion (Ae) of the mantissa from the upper 12 bit positions of the Y register 504-1 to the lower twelve bit positions of the register. Additionally, it generates signal FYRKM10 which loads the upper and middle sections of the Y register 504-1 with the upper and middle portions (Au, Am) of the floating point mantissa from control memory register 502-8. Also, during this cycle, the SU generates subcommand signal FBRMA10 which loads the exponent and low order portion (Ae, Al) of the mantissa stored in the Y register into the B register via main adder 504-4.

Figure 12:
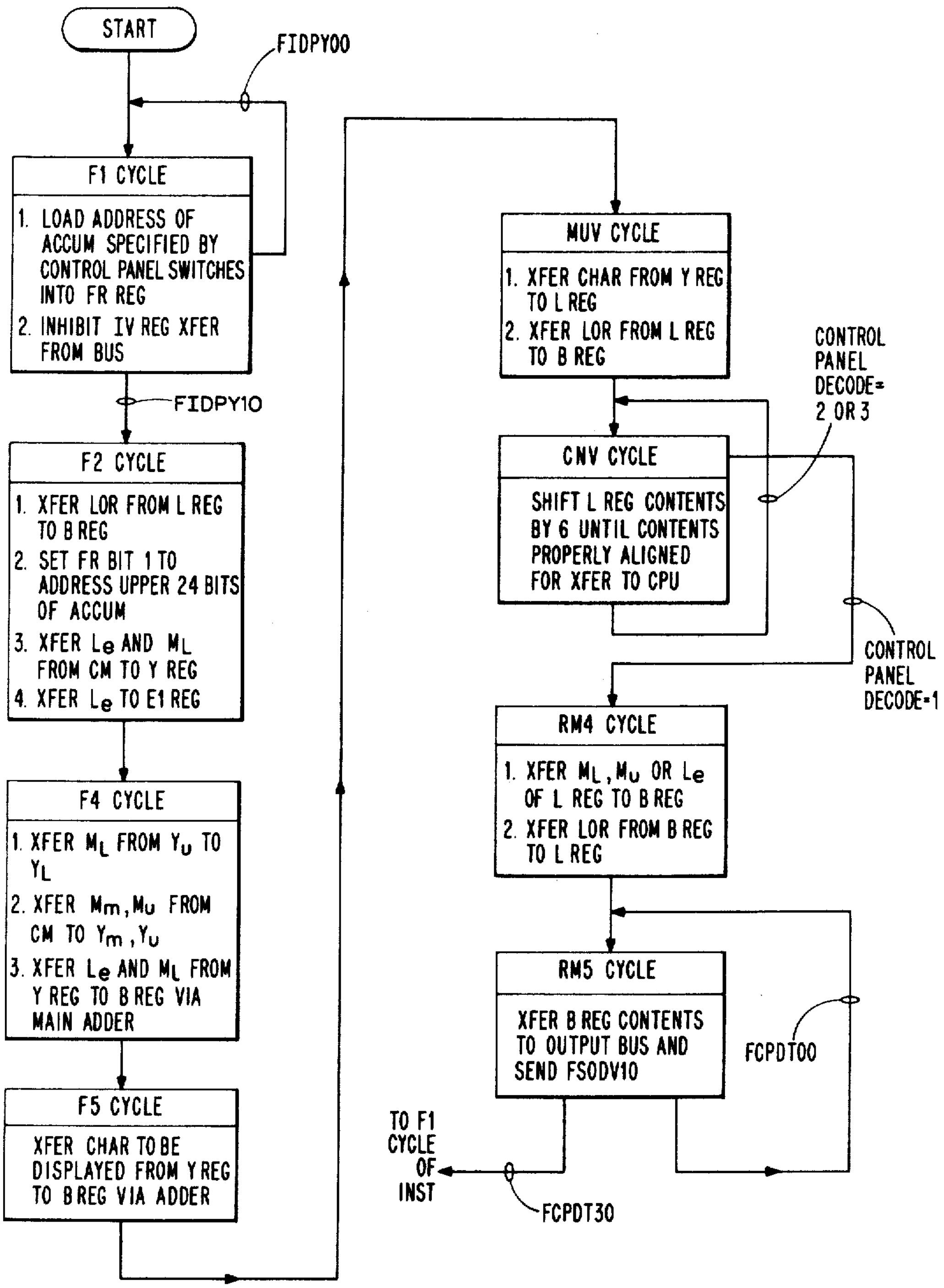
FIG. 12 illustrates the various processing cycles performed by the scientific unit in processing a display command in accordance with the present invention.

As seen from FIG. 12, this completes the F4 cycle and the SU then is switched to an F5 cycle via AND gate 501-46 of FIG. 6*a*. During this cycle, the SU generates subcommand signals including signal FBRMA10 which transfer a character to be displayed from the Y register 504-1 to the B register 504-2 via the main adder 504-4. Thereafter, the SU switches to a MUV cycle of operation wherein it generates signals FBRLR10 and FLRBR10 which transfer characters in the B register 504-1 to the L register 504-3 and transfers the low order result stored in the L register 504-3 to the B register 504-2.

From FIG. 6*a*, it is seen that the SU then switches to a conversion (CNV) cycle of operation wherein it is operative to generate signal FL6LS10 which shifts the contents of the L register 504-3 by 6 until properly aligned for transfer to the CPU. The number of times the CNV cycle is executed is determined by the results of the decoding operation performed by decoder circuit 500-77. Specifically, the contents of the L register 504-3 are shifted left by six bit positions when the control panel switch decode signals correspond to a two or three which indicates that the characters for either the low order or high order portion of the mantissa are contained in the L register 504-3. Therefore, further alignment is necessary and the SU enters a second CNV cycle. When the decode signals correspond to a one, this indicates that no further alignment of the exponent portion of the floating point number is required and the SU enters an R4M cycle.

During the R4M cycle, the SU generates subcommand signals FBRLR10 and FLRBR10. The first signal causes the low order and middle portion of the mantissa or exponent stored in the L register 504-3 to be loaded into the B register 504-2. At the same time, the second signal causes the low order result stored in the B register 504-2 to be loaded into the L register 504-3. At the completion of the RM4 cycle, the SU enters an RM5 cycle wherein it applies the B register contents to the output bus and generates a SU data valid signal (i.e., signal FSODV10) to the CPU.

The CPU in response to the signal FSOVV10 is operative to transfer the signals on the bus into the N register 301 and then to the S register 10 for display by the control console indicator circuits. When the CPU completes this operation, it generates a CPU data taken signal (FCPDT30) which causes the SU to return to F1 cycle of operation. This completes the joint execution of the display command by both the CPU and SU.

From the foregoing, it is seen that the above arrangement with little additional logic circuits enables an operator to display a portion or an entire floating point number stored within the control memory of the SU. By arranging the SU to treat the display command signal as a pseudo instruction, a minimal amount of additional logic circuits are required to provide the display facility. It will also be noted that a minimal of additional logic circuits is required in the CPU since the CPU need only to forward the display request initiated by the operator to the SU for execution and return the results to the register 110 for display.

It will be appreciated to those skilled in the art that many changes can be made to the embodiment illustrated without departing from the sprit and scope of the present invention.

While in accordance with the provisions and statutes, there has been illustrated and described the best form of the invention known, certain changes may be made in the technique and in the system of the invention without departing from the spirit of the invention as set forth in the appended claims and in some cases, certain features of the invention may be used to advantage without a corresponding use of other features.

Having described the invention, what is claimed as new and novel is:

1. A data processing system comprising:

addressable main memory means for storing program instructions and data relating to at least one program;

input-output data processing means operatively coupled to said memory means and coupled to a plurality of peripheral devices, said input-output data processing means being operative to execute data transfer operations specified by data transfer instructions included in said program for effecting transfers of data at a predetermined rate between said memory means and any one of said plurality of peripheral devices as specified in accordance with said data transfer instructions;

central processing means coupled to said memory means and to said input-output data processing means, said central processing means being operative to process each of said program instructions, said central processing means including:

storage means coupled to said memory means for receiving a command portion of each program instruction read from said memory means;

decoding circuit means coupled to said storage means, said decoding circuit means being operative to generate control signals designating the type of operation specified by said instruction; and, control means coupled to receive signals from said decoding circuit means and said input-output processing means, said control means being conditioned by said control signals to direct said central processing means in the processing of said instruction;

scientific processing means coupled to said central processing means, said scientific processing means being operative to execute floating point operations specified by program instructions, said scientific processing means including:

control storage means coupled to store data required for the execution of said floating point operations;

said central processing control means including cycle control means, said cycle control means being operative in response to said control signals to condition said central processing means to begin the processing of next program instruction within a predetermined minimum period of time so as to overlap the processing of said next program instruction with the execution of operations specified by a previous instruction.

2. The system of claim 1 wherein said input-output processing means includes:

a plurality of sector transfer paths coupled in common to different ones of said plurality of peripheral devices;

storage means coupled to said central processing means for receiving control information from said central processing means during the processing of a data transfer instruction, said control information including digital signals identifying a number of resources required for said transfer, said resources including a sector path, a transfer rate and one of said different ones of said plurality of peripheral devices specified by said instruction;

control means coupled to said storage means and to each of said sector paths, said control means being operative upon determining the availability of all of said resources to generate a control signal; and, said cycle control means of central processing means being conditioned by said control signal to begin the processing of said next instruction.

3. A data processing system comprising:

addressable main memory means for storing program instructions and data relating to at least one program;

central processing means coupled to said memory means, said central processing means being operative to process each of said program instructions, said central processing means including:

storage means coupled to said memory means for receiving predetermined portions of each program instruction fetched from said memory means;

decoding circuit means coupled to said storage means said decoding circuit means being operative to generate signals designating each program instruction of a predetermined type as being included within one of a plurality of separate classes; and, control means coupled to receive said signals from said decoding circuit means;

scientific processing means coupled to said central processing means, said scientific processing means being operative to execute floating point operations specified by said each program instruction of a predetermined type, said scientific processing means including:

register means coupled to said central processing means for storing control information specifying a type of operation said processing means is to perform; and, control storage means coupled to said central processing means for storing data required for the execution of said floating point operations;

said central processing control means being operative in response to certain ones of said signals to begin processing of a next program instruction upon completing a transfer of information to said register means.

4. The system of claim 3 wherein said predetermined portions of said each program instruction of a predetermined type are coded to define said classes in terms of a plurality of different types of transfer operations to be performed by said scientific processing means.

5. The system of claim 4 wherein said control storage means includes a plurality of register storage locations for storing operand data signals and wherein said different types of transfer operations specified by coding include register to register transfers involving transfers between certain ones of said storage locations, memory to register transfers involving transfers of operand data signals from said main memory means to one of said storage locations and register to memory transfers involving transfers of operand data signals from one of said storage locations to said main memory means.

6. The system of claim 5 wherein said central processing control means includes control storage means, said control storage means including first means operative in response to a first set of signals designating said register to register transfers to cycle condition said control means to fetch a next instruction upon completing a transfer of digital signals representing said predetermined portions of said program instruction stored in said storage means to said scientific processing means.

7. The system of claim 6 wherein said control storage means includes second means operative in response to a second set of signals designating said memory to register transfers to condition said control means to fetch said next instruction upon completing a transfer of digital signals representing said predetermined portions of said program instruction in said storage means and a transfer of digital signals from said memory means representing an operand to be processed.

8. The system of claim 3 wherein said storage means of said central processing means includes an op code register and first and second registers coupled to said memory means for storing signals corresponding to an op code character, a first control character and second control character respectively, said decoding circuit means including:

first logic circuit means coupled to receive said signals of said op code character, said first logic circuit means being operative upon sensing that said op code signals specify said predetermined type of program instruction being operative to generate a first control for indicating to said scientific processing means that it is to execute an operation specified by a second character stored in said second register;

second logic circuit means coupled to said op code register, said second logic circuit means being operative in response to a predetermined set of second control character signals to generate a second control signal indicating a predetermined one of said classes of instructions; and, transfer means coupled to said first and said second logic circuit means, said transfer means being conditioned by said first and second control signals to generate a sequence of transfer control signals for applying signals stored in said op code register and said first and second registers to said scientific processing means.

9. A data processing system comprising: addressable main memory means for storing instructions and data relating to a least one program;

first processing means coupled to said memory means for fetching each of said instructions, said first processing means being operative to execute those instructions specifying a operations upon numerical data of a first type, and comprising:

storage means coupled to said memory means for receiving a command portion of each instruction read from said memory means;

decoding means coupled to said storage means said decoding means including means being conditioned by said storage means to generate control signals identifying instructions specifying operations upon numerical data of a second type as being included in one of a plurality of classes; and cycle control means coupled to said decoding means, said control means being conditioned by said signals from said decoding means to generate signals for initiating the fetching of a next program instruction; and, second processing means coupled to said first processing means and operative to execute said instructions specifying operations upon numerical data of said second type, said second processing means including:

control storage means coupled to store data during the execution of said instruction;

register storage means coupled to receive signals from said first processing means representative of an instruction read from said memory; and, control means coupled to said register storage means for generating signals for executing said instructions; and, said cycle control means of said first processing means being conditioned by said signals specifying predetermined ones of said classes to begin extraction of a next instruction of said program within a predetermined time period so as to enable an overlap in execution of said instructions specifying operations upon numerical data of said first type with the execution of said predetermined ones of said classes by said second processing means.

10. The system of claim 9 wherein said decoding means includes means coupled to said storage means, said means being operative in response to a command portion of each instruction specifying operations on said first type of numerical data to generate signals for conditioning said first processing means to execute said operations and wherein said numerical data of said first type and said numerical data of said second type respectively are coded as fixed point numbers and floating point numbers.

11. The system of claim 9 wherein said system further includes:

a third processing means operatively coupled to said memory means and coupled to a plurality of peripheral devices, said third processing means being operative to execute data transfer operations specified by data transfer instructions included in said program for effecting transfers of data at predetermined rates between said memory means and any one of said plurality of peripheral devices as specified in accordance with said data transfer instructions; and, wherein said first processing cycle control means is operative in response to a signal from said third processing means to condition said first processing means to initiate said fetching of said next instruction of said program.

12. The system of claim 1 wherein said third processing means includes:

a plurality of sector transfer paths coupled in common to different ones of said plurality of peripheral devices;

storage means coupled to said first processing means for receiving control information from said first processing means during the fetching of a data transfer instruction, said control information including digital signals coded to identify a number of resources required for said transfer, said resources including a sector path a plurality of time slots required for a predetermined transfer rate; and oen of said different ones of said plurality of peripheral devices; and, control means coupled to said storage means and to each of said sector paths, said control means being operative upon determining the availability of all of said resources to generate said signal.

13. The system of claim 9 wherein said storage means includes a plurality of register means, each register means coupled to receive a different predetermined portion of each instruction from said memory means, said system further includes a first bus coupled to said plurality of register means, to said control storage means and to said register storage means and said decoding means of said first processing means including transfer control means being conditioned by said signals to generate signals for applying selectively to said bus the contents of said plurality of said register means in a predetermined order.

14. The system of claim 13 wherein said plurality of register means includes:

an op code register for storing the op code character of an instruction;

a first register for storing a first control character of said instruction;

a second register for storing a second control character of said instruction; and wherein said control storage means includes a plurality of addressable storage locations for storing operand data; and said transfer control means being operative to generate said signals to apply to said bus a predetermined portion of said op code character and said second character contents of said op code register and said second register respectively to said register storage means for designating the format of said instruction and the operation to be executed by said second processing means and to apply said first character contents of said first register to said control storage means to specify the storage locations to be referenced during the execution of said instruction.

15. The system of claim 14 wherein said system further includes:

input means for generating signals representative of an address;

a second bus coupled to said input means and to said control means; and a third bus coupled to said first processing means and to control storage means and wherein said control means includes decoding means coupled to said second bus and to said control storage means, said decoding means being operative in response to signals representative of predetermined addresses from said input means to condition said control means to generate a sequence of signals for enabling access to one of said storage locations for read out of the contents to said third bus for subsequent display by said first processing means.

16. The system of claim 9 wherein said command portion of each of said instructions specifying operations upon numerical data of said second type is coded to define said classes in terms of a plurality of different types of transfer operations to be performed by said second processing means.

17. The system of claim 16 wherein said command portion codes specifying said different types of transfer operations include register to register transfers of operand data signals from said main memory means to one of said storage locations and register to memory transfers involving transfers of operand data signals from one of said storage locations to said main memory means.

18. A data processing system comprising:

addressable main memory means for storing program instructions and data relating to at least one program;

input/output data processing means operatively coupled to said memory means and coupled to a plurality of peripheral devices, said input/output data processing means being operative to execute data transfer operations specified by data transfer instructions included in said program for effecting transfers of data at a predetermined rate between said memory means and any one of said plurality of peripheral devices as specified in accordance with said data transfer instructions, said input/output data processing means including:

storage means coupled to storage a plurality of control characters during the extraction of each data transfer instruction; and control means coupled to said storage means and to said plurality of peripheral devices, said control means being conditioned by said storage means to generate a control signal indicating the availability of one of said peripheral devices specified by a predetermined one of said control characters; and central processing means coupled to said memory means and to said input/output data processing means, said central processing means being operative to extract each of said program instructions, said central processing means including:

storage means coupled to said memory means for receiving a command portion of each program instruction read from said memory means;

decoding circuit means coupled to said storage means, said decoding circuit means being operative to generate control signals designating the type of operation specified by said instruction; and, control means coupled to receive signals from said decoding circuit means and said input/output processing means, said control means being conditioned by said control signal from said input/output processing means during the extraction of said each data transfer instruction to generate signals for initiating the extraction of a next instruction so as to overlap execution of said each data transfer instruction with said extraction of said next instruction.

19. The system of claim 18 wherein said system includes scientific processing means coupled to said central processing means, said scientific processing means being operative to execute instructions specifying operations upon numerical data in floating point representation, said scientific processing means including:

input register means coupled to said central processing means for storing control processing information specifying the type of operation to be performed, and, an addressable control storage means having a plurality of storage locations, said storage means being coupled to receive data required for executing said operations;

control means coupled to said input register means, said control means being conditioned by said input register means to generate signals for executing said operations; and wherein said decoding circuit means includes means operative to generate signals in response to said command portion of said instructions specifying operations upon numerical data in said floating point representation as being in one of a plurality of separate classes, said central processing control means being operative in response to certain ones of said signals to generate said signals for initiating the extraction of a next instruction so as to overlap execution of said instructions by said scientific processing means with said extraction of said next instruction.

20. The system of claim 19 wherein said command portion of said each program instruction specifying said operations upon numerical data in said floating point representation are coded to define said classes in terms of a plurality of different types of transfer operations to be performed by said scientific processing means.

21. The system of claim 20 wherein said control storage means includes a plurality of storage locations for storing operand data signals and wherein said different types of transfer operations specified include register to register transfers involving transfers between certain ones of said storage locations, memory to register transfers involving transfers of operand data signals from said main memory means to one of said storage locations and register to memory transfers involving transfers of operand data signals from one of said storage locations to said main memory means.

22. The system of claim 21 wherein said central processing control means includes control storage means, said control storage means including first means operative in response to a first set of signals designating said register to register transfers to condition said control means to fetch a next instruction upon completing a transfer of digital signals representing said command portion of said instruction stored in said storage means to said scientific processing means.

23. The system of claim 22 wherein said control storage means includes second means operative in response to a second set of signals designating said memory to register transfers to condition said control means to fetch said next instruction upon completing a transfer of digital signals representing said command portion of said program instruction in said storage means and a transfer of digital signals from said memory means representing an operand to be processed.

24. The system of claim 19 wherein said system further includes:

input means for generating signals representative of an address;

a first bus coupled to said input means and to said control means; and, a second bus coupled to said central processing means and to said control storage means; and wherein said control means includes decoding means coupled to said first bus and to said control storage means, said decoding means being operative in response to signals representative of predetermined addresses from said input means to condition said control means to generate a predetermined sequence of signals for enabling access to one of said storage locations for read out of the contents to said second bus for subsequent display by said central processing means.

25. A data processing apparatus for processing instructions of at least one program, said apparatus comprising:

central processing means for extracting said instructions of said one program, comprising:

register means for storing predetermined portions of first and second types of instructions specifying operations upon numerical data coded in first and second forms respectively;

decoding means coupled to said register means, said decoding means being conditioned by said predetermined portions of said first instructions to generate signals designating each of said instructions as being included within one of a plurality of separate classes; and control means coupled to said decoding means, said control means being operative to generate signals for executing said second type of instructions, and, subprocessing means coupled to said central processing means, said subprocessing means being operative to execute said first type of instructions, said subprocessing means comprising:

input register means coupled to said register means of said central processing means;

addressable control memory means, coupled to said input register means, said memory means including a plurality of storage locations for storing data required during the execution of said first type of instructions; and, control means coupled to said input register means, said control means being operative to generate signals for executing said first type of instructions; and said central processing control means being operative in response to certain ones of said signals to begin extracting a next instruction upon completing a transfer of signals representative of said predetermined portions of one of said first type of instruction to said input register means thereby enabling said cental processing means to overlap execution of said second type of instructions with the execution of said first type of instructions by said subprocessing means.

26. The apparatus of claim 25 wherein said first and second type of instructions respectively are coded to specify operations upon numerical data in floating point form and in fixed point form.

27. The apparatus of claim 25 wherein said apparatus further includes:

input means for generating signals representative of an address;

a first bus coupled to said input means and to said control means; and, a second bus coupled to said central processing means and to said control storage means and wherein said control means coupled to said first bus and to said control storage means, said decoding means being operative in response to signals representative of predetermined addresses from said input means to condition said control means to generate a predetermined sequence of signals for enabling access to one of said storage locations for read out of the contents to said second bus for subsequent display by said central processing means.

* * * * *

UNITED STATES PATENT OFFICE
CERTIFICATE OF CORRECTION

Patent No. 3,811,114 Dated May 14, 1974

Inventor(s) Richard A. Lemay and David D. Devoy

It is certified that error appears in the above-identified patent and that said Letters Patent are hereby corrected as shown below:

In the Abstract of the Disclosure, line 14, delete "when" and insert --When--.

Column 32, line 46, delete "cycle condition said" and insert --condition said cycle--.

Column 33, line 25, delete "a" and insert --at--.

Column 34, line 28, delete "1" and insert --11--.

Column 34, line 41, delete "oen" and insert --one--.

Column 35, line 3, after "and", insert --,--.

Signed and sealed this 1st day of October 1974.

(SEAL)
Attest:

McCOY M. GIBSON JR.
Attesting Officer

C. MARSHALL DANN
Commissioner of Patents